United States Patent
Butterworth et al.

(10) Patent No.: US 9,926,911 B2
(45) Date of Patent: *Mar. 27, 2018

(54) WIND TURBINE AIR DEFLECTOR SYSTEM CONTROL

(71) Applicant: GE Infrastructure Technology, LLC., Greenville, SC (US)

(72) Inventors: Jeffrey A. Butterworth, Rocklin, CA (US); Tobias G. Wehrhan, Davis, CA (US)

(73) Assignee: GE Infrastructure Technology, LLC, Greenville, SC (US)

( * ) Notice: Subject to any disclaimer, the term of this patent is extended or adjusted under 35 U.S.C. 154(b) by 700 days.

This patent is subject to a terminal disclaimer.

(21) Appl. No.: 14/484,873

(22) Filed: Sep. 12, 2014

(65) Prior Publication Data
US 2016/0076517 A1    Mar. 17, 2016

(51) Int. Cl.
  F03D 7/02    (2006.01)
  F03D 7/04    (2006.01)
  F03D 17/00    (2016.01)

(52) U.S. Cl.
  CPC ............ *F03D 7/044* (2013.01); *F03D 7/0232* (2013.01); *F03D 17/00* (2016.05); *F05B 2270/3015* (2013.01); *Y02E 10/723* (2013.01)

(58) Field of Classification Search
  CPC ........ F03D 7/0232; F03D 7/044; F03D 7/045; F03D 17/00; F05B 2270/3015; Y02E 10/723
  See application file for complete search history.

(56) References Cited

U.S. PATENT DOCUMENTS

| 8,137,066 B2 | 3/2012 | Mayda |
| 8,192,161 B2 | 6/2012 | Baker et al. |
| 2010/0215493 A1 | 8/2010 | Abdallah et al. |
| 2014/0334928 A1* | 11/2014 | Baek ............... F03D 7/0232 416/1 |

FOREIGN PATENT DOCUMENTS

| EP | 1623111 A1 | 2/2006 |
| EP | 2128385 A2 | 12/2009 |
| EP | 2778405 A2 | 9/2014 |
| WO | 2004099608 A2 | 11/2004 |
| WO | 2013091638 A1 | 6/2013 |
| WO | WO 2013/087468 A1 * | 6/2013 ........... F03D 7/0232 |

OTHER PUBLICATIONS

Office Action in CA2,901,366 dated Jun. 7, 2016.
Communication with European Search Report in EP15184668 dated Feb. 5, 2016.
U.S. Appl. No. 13/837,262, filed Mar. 15, 2013.
U.S. Appl. No. 13/837,220, filed Mar. 15, 2013.

* cited by examiner

Primary Examiner — Christopher Besler
(74) Attorney, Agent, or Firm — Dority & Manning, P.A.

(57) ABSTRACT

One or more controllers may perform one or more methods to control one or more air deflector units of one or more wind turbine rotor blades. The methods include per-blade control methods that may be performed, e.g., to reduce blade loading caused by wind gusts. The methods also include collective control methods that may be performed, e.g., to reduce tower motion and/or rotor speed.

9 Claims, 22 Drawing Sheets

WIND TURBINE AIR DEFLECTOR SYSTEM CONTROL

BACKGROUND

A wind turbine includes a rotor that turns in response to wind force on the rotor blades. In order to prevent damage from excessive wind loads on turbine blades, the rotational speed of a rotor is typically kept at or below a rated design speed for that turbine. Conventionally, wind turbines have used blade pitch control to limit rotor speed and loading from increased wind speed. In many situations, however, blade pitch control is a less-than-ideal solution. For example, transient wind gusts may result in forces that are strong enough to damage equipment when the average wind speed is not high enough to cause damage. These gusts may occur unexpectedly and rapidly. It some such cases, blade pitch actuators may not respond quickly enough to avoid potential damage to the turbine. As another example, there may be a significant difference between wind speed near the ground and wind speed at blade heights corresponding to the top of the rotor's rotational arc. When this occurs, pitching a blade back and forth during each rotation may impose excessive wear on blade pitch actuators.

For these and other reasons, deployable air deflectors have been developed for wind turbine blades. Examples of such deflectors can be found in commonly-owned U.S. Pat. No. 8,192,161, which patent is incorporated by reference herein. There remains a need for additional methods and systems to control air deflection systems incorporated into wind turbine blades.

SUMMARY

This Summary is provided to introduce a selection of concepts in a simplified form that are further described below in the Detailed Description. This Summary is not intended to identify key features or essential features of the invention.

In some embodiments, a controller performing a control method may receive sensor data indicative of a current loading condition of a blade of a rotating wind turbine rotor. The blade may include a plurality of air deflector units. The air deflector units may have a current deployment configuration. The blade may further include multiple sensors and the sensor data may include a separate sensor value corresponding to each of the multiple sensors. The controller may obtain a set of error values by subtracting a different one of multiple threshold scalar values from each of multiple different input values, with each of the input values comprising a value based at least in part on a different one of the sensor values. The controller may sum values based at least in part on the set of error values to obtain a first summed value. The controller may generate actuator commands to at least one of the air deflector units to implement an updated deployment configuration of the air deflector units, with the updated deployment configuration corresponding to a data value based at least in part on the first summed value.

In some embodiments, a controller performing a control method may receive sensor data indicative of a current loading condition of a blade of a rotating wind turbine rotor. The blade may include a plurality of air deflector units having a current deployment configuration. The controller may generate a first data value based at least in part on the received sensor data using a first sequence of computational operations. The controller may generate a second data value based at least in part on the received sensor data using a second sequence of computational operations. The first data value may be different from the second data value and the first sequence of computational operations may be different from the second sequence of computational operations. The controller may combine requirements of a first deployment configuration corresponding to the first data value and a second deployment configuration corresponding to the second data value to obtain a combined deployment configuration. The controller may generate actuator commands to at least one of the air deflector units to implement the combined deployment configuration.

In some embodiments, a controller performing a control method may receive sensor data indicative of a current loading condition of a blade of a rotating wind turbine rotor, with the blade including a plurality of air deflector units having a current deployment configuration. The controller may generate a first data value based at least in part on the received sensor data. The controller may filter the first data value using a pass band filter to obtain a filtered first data value. The pass band filter may comprise a pass band selected to limit frequency content of the filtered first data value to frequencies approximately based on a rotational speed of the wind turbine rotor. The controller may subtract a threshold scalar value from the filtered first data value and may obtain an error value based at least in part on the subtraction of the threshold scalar value from the filtered first data value. The controller may generate actuator commands to at least one of the air deflector units to implement an updated deployment configuration of the air deflector units corresponding to a value based at least in part on the error value.

In some embodiments, a controller performing a control method may receive sensor data indicative of deflection of a tower supporting a wind turbine having a rotating rotor. The rotor may include multiple blades. Each of the blades may include a plurality of air deflector units. The air deflector units of the blades may have a current collective deployment configuration. The controller may generate a first data value based at least in part on the sensor data. The controller may generate actuator commands, based at least in part on the first data value, to at least one of the air deflector units of each of the blades to implement an updated collective deployment configuration of the air deflector units of the blades.

In some embodiments, a controller performing a control method may receive speed data indicative of rotational speed of a rotating wind turbine rotor. The rotor may include multiple blades, each of the blades may include a plurality of air deflector units, and the air deflector units of the blades may have a current collective deployment configuration. The controller may generate a first data value based at least in part on the speed data. The controller may generate actuator commands, based at least in part on the first data value, to at least one of the air deflector units of each of the blades to implement an updated collective deployment configuration of the air deflector units of the blades.

In some embodiments, a controller performing a control method may receive data indicative of a condition of a rotating wind turbine rotor. The rotor may include multiple blades, each of the blades may include a plurality of air deflector units, and the air deflector units of the blades may have a current collective deployment configuration. The controller may generate, based at least in part on the received data, a collective data value corresponding to a collective deployment configuration. The controller may also generate, for each of the blades, a per-blade data value corresponding to a per-blade deployment configuration for that blade. The controller may determine, based at least in part on the collective data value and the per-blade data values, a collective combined deployment configuration based on requirements of the collective deployment configuration and the requirements of the per-blade deployment configurations. The controller may generate actuator commands to at least one of the air deflector units of each of the blades to implement the collective combined deployment configuration and may transmit the actuator commands.

Embodiments include, without limitation, the above and other methods for controlling air deflector units of one or more wind turbine blades, controllers configured to perform such methods and non-transitory machine-readable media storing instructions executable by controllers to perform such methods.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

Figure 1:
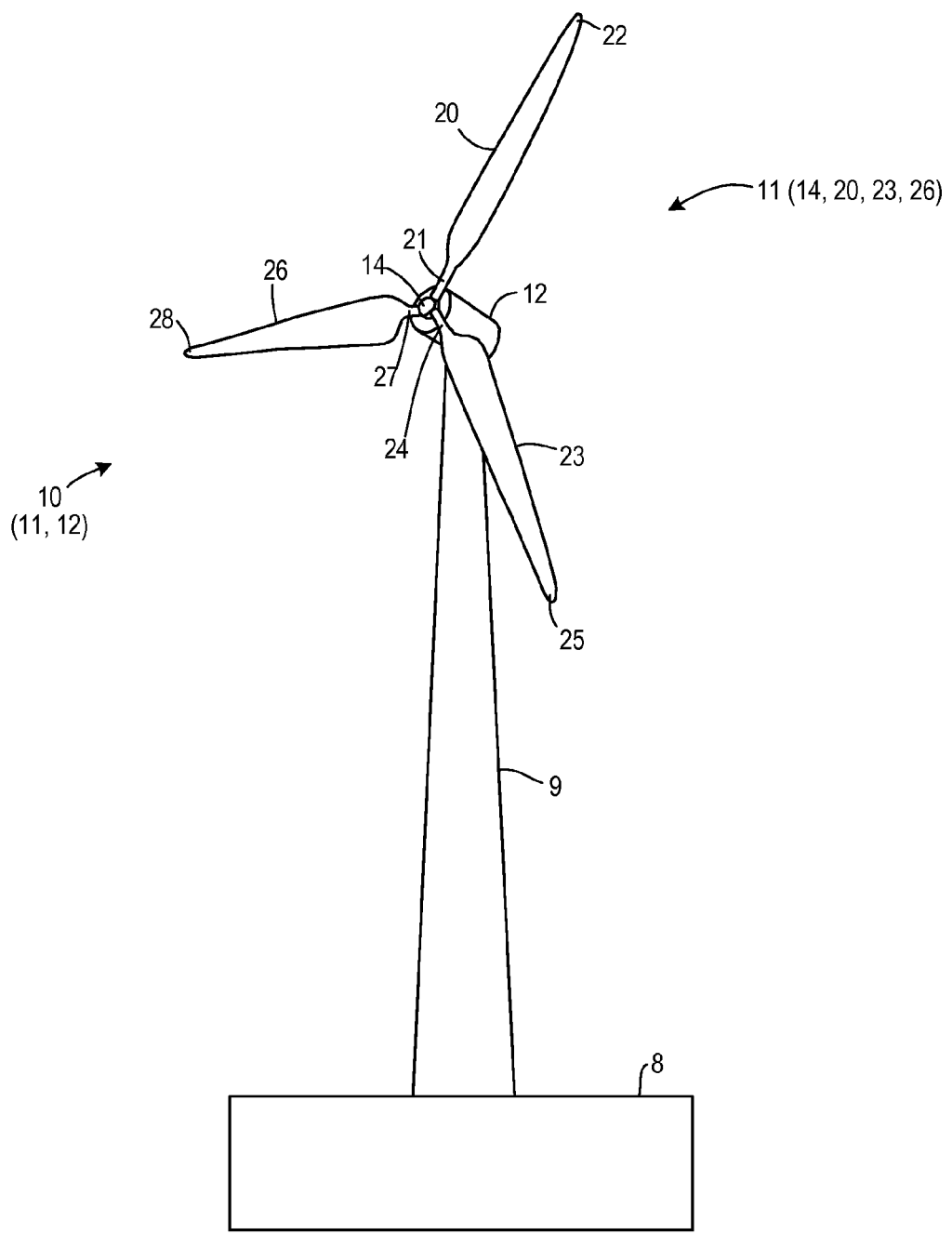
FIG. 1 is a front perspective view of a wind turbine according to some embodiments.

FIG. 1 is a front perspective view of a wind turbine 10 according to some embodiments. Wind turbine 10, which is mounted atop a tower 9 secured in a foundation 8, includes a rotor 11 and a nacelle 12. Nacelle 12 may house a generator that is rotationally coupled by a drive train to a hub 14 of rotor 11. The drive train and generator are not visible in FIG. 1. Nacelle 12 may also house one or more controllers such as are described below.

In addition to hub 14, rotor 11 includes three blades 20, 23, and 26. In other embodiments, a wind turbine rotor may include more or fewer blades. Each of blades 20, 23, and 26 may be coupled to hub 14 by a conventional pitch actuator that allows the pitch of the rotor blade to be varied. In one arrangement, blades 20, 23, and 26 may be fixed length rotor blades having respective root portions 21, 24, and 27 and respective tip portions 22, 25 and 28. In other embodiments, each of blades 20, 23, and 26 may be variable length blades having blade tips that can extend and retract.

Figure 2:
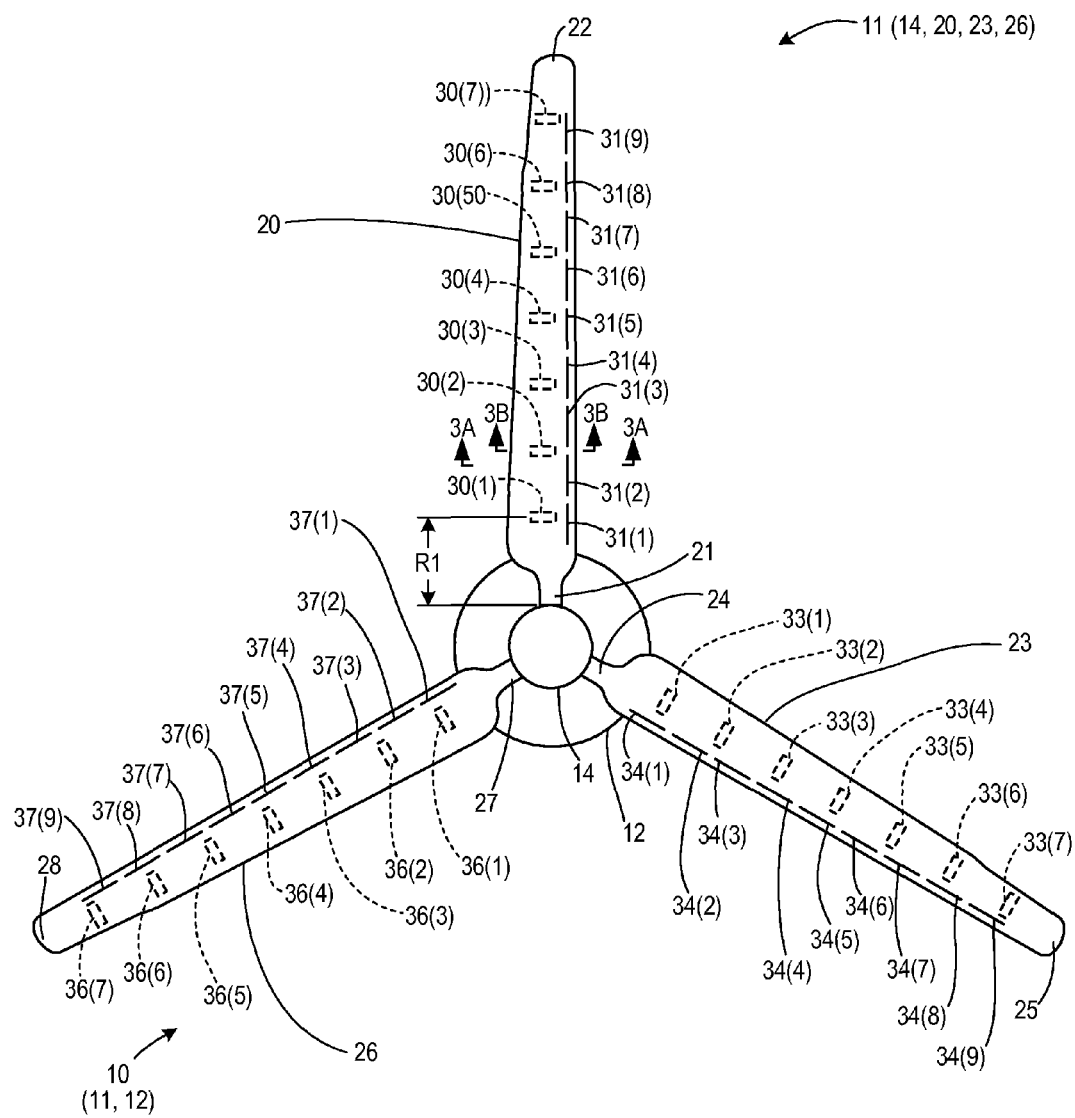
FIG. 2 is a partially schematic front view of the wind turbine of FIG. 1.

FIG. 2 is a partially schematic front view of wind turbine 10 showing additional details of blades 20, 23, and 26. Blade 20 includes multiple sensors 30(1) through 30(7). Those sensors will be referenced collectively and/or generically using the same reference number 30, but without an appended parenthetical. A similar convention will be followed with regard to components of sensors 30. Each sensor 30 has a location on blade 20 that has a distance R from the root of blade 20. For example, sensor 30(1) is displaced from the root of blade 20 by a distance R1. Each of sensors 30 detects conditions at its location on blade 20 and outputs sensor data indicative of those conditions. Those conditions, and thus the sensor data, are further indicative of loads on blade 20. As explained in more detail below, each of sensors 30 may be a differential pressure sensor. In other embodiments, other types of sensors (e.g., strain gauges, tip deflection sensors) may be used. In still other embodiments, more than one type of sensor may be used. Although FIG. 2 shows blade 20 with seven sensors 30, this is only one example. In other embodiments a blade may have more or fewer sensors. The positioning of sensors 30 is also merely one example. In other embodiments, sensors may be placed at other locations on a blade.

Blade 20 further includes multiple air deflector units 31(1) through 31(9) positioned along the length of blade 20. Those air deflector units will be referenced collectively and/or generically using the same reference number 31, but without an appended parenthetical. A similar convention will be followed with regard to components of air deflector units 31. As explained below, each of air deflector units 31 includes a deflector element that can be extended into and retracted from air flow over blade 20. When extended, a deflector element may partially obstruct air flow across a portion of the surface of blade 20 and thereby affect blade loading and/or rotor speed. Although FIG. 2 shows blade 20 with nine air deflector units 31, in other embodiments a blade may have more or fewer air deflector units. The positioning of air deflector units 31 shown in FIG. 2 is also merely one example. In other embodiments, air deflector units may have other locations on a blade.

Blades 23 and 26 are substantially identical to blade 20. In particular, each of blades 23 and 26 similarly includes sensors and air deflector units. Blade 23 includes seven sensors 33(1) through 33(7) and nine air deflector units 34(1) through 34(9). Sensors 33 and air deflector units 34 may be similar to sensors 30 and air deflector units 31 and may be positioned on blade 23 in a manner similar to the manner in which sensors 30 and air deflector units 31 are positioned in blade 20. Blade 26 includes seven sensors 36(1) through 36(7) and nine air deflector units 37(1) through 37(9). Sensors 36 and air deflector units 37 may also be similar to sensors 30 and air deflector units 31 and may be positioned on blade 26 in a manner similar to the manner in which sensors 30 and air deflector units 31 are positioned in blade 20.

Figure 3A:
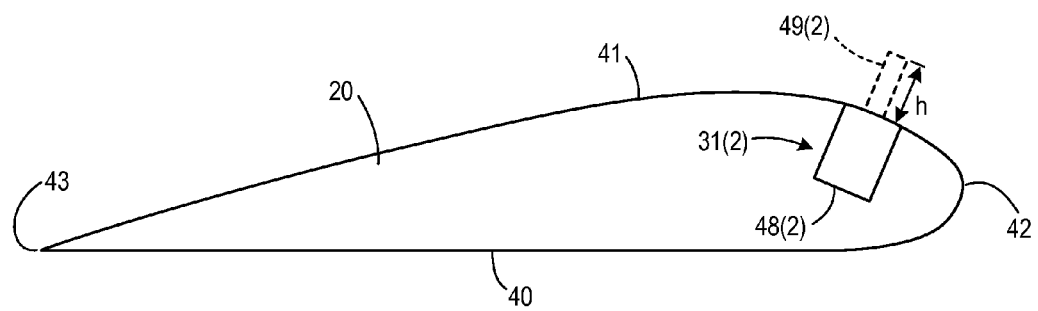
FIG. 3A is a partially schematic area cross-sectional view of a wind turbine rotor blade taken from a location indicated in FIG. 2.

FIG. 3A is an area cross-sectional view of blade 20, taken from the location indicated in FIG. 2, showing air deflector unit 31(2) in partially schematic form. Indicated in FIG. 3A are the high pressure side 40, low pressure side 41, leading edge 42, and trailing edge 43 of blade 30. Air deflector unit 31(2), which may be a gust counteracting device such as is described in U.S. Pat. No. 8,192,161, may include a frame/housing 48(2) and a deflector element 49(2) that can be extended from and retracted into housing 48(2). Deflector element 49(2) is fully retracted in FIG. 3A. When fully retracted, the upper edge of deflector element 49(2) may be flush with the outer surface of blade 20. When extended its full amount, and as shown in broken lines, deflector element 49(2) may extend a distance h above the outer surface of blade 20. As explained in more detail below, an air deflector unit may be configured to extend its deflector element less than its full possible extension distance h. The distance h need not be the same for every air deflector unit. For example, one air deflector unit may be configurable to extend its deflector element up to an amount h=x millimeters, while another air deflector unit may be configurable to extend its deflector element up to an amount h=y millimeters, where x≠y. As used herein with regard to deflector element extension, h refers to a maximum extension distance for an air deflector unit in question, and does not imply that h is the same for all air deflector units on a blade.

Air deflector units 31(1) and 31(3) through 31(9) may be of similar construction as, and operate in a manner similar to that described for, air deflector unit 31(2). Each air deflector unit 31 may include a separate housing 48 and a deflector element 49 that can be extended or retracted independently of the extension or retraction of other deflector elements. Although FIG. 3A suggests that all air deflector units 31 are of equal size and are evenly spaced along the length of blade 20, this need not be the case. In some embodiments, for example, air deflector units located further from a blade root may have deflector elements with lengths that are shorter in the root-to-tip direction than deflector elements in air deflector units located closer to the blade root. As another example, in some embodiments air deflector units may be clustered near the blade root and near the blade tip.

In some embodiments, each air deflector unit 31 may be pneumatically actuated and connected to air lines, not shown. Those air lines may supply compressed air to sides of a piston located in a housing 48 and coupled to a deflector element 49. Electrically operated solenoid valves may control supply and venting of that air to different sides of that piston to extend or retract the deflector element 49 a desired amount. In other embodiments, air deflector units may include an electrically powered servo or some other type of actuator mechanism to extend and retract a deflector element. All air deflector units of a blade need not have the same type of actuator. For example, some air deflector units might be pneumatically actuated and other deflector elements might be actuated by electric motors.

Although air deflector units 31 are located on low pressure side 41 near leading edge 42, this is but one possible arrangement. In other embodiments, for example, some or all of air deflector units 31 may be located elsewhere. For example, air deflector units could also or alternatively be positioned on high pressure side 40. Air deflector units could also or alternatively be positioned near trailing edge 43 and/or at other locations between trailing edge 43 and leading edge 42.

Figure 3B:
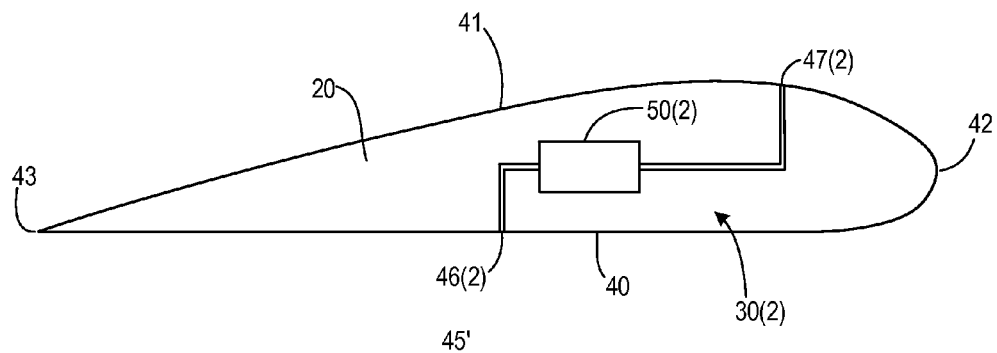
FIG. 3B is a partially schematic area cross-sectional view of a wind turbine rotor blade taken from another location indicated in FIG. 2.

FIG. 3B is an area cross-sectional view of blade 20, taken from the location indicated in FIG. 2, showing sensor 30(2) in partially schematic form. In some embodiments, each sensor 30 may be a differential pressure transducer such as is described in commonly-owned U.S. patent application Ser. No. 13/837,262, filed Mar. 15, 2013, and incorporated by reference herein. Sensor 30(2) includes a pressure transducer 50(2) coupled to an orifice 46(2) on high pressure side 40 and an orifice 47(2) on low pressure side 41. Other sensors 30 may be similar to sensor 30(2). In particular, each may include a pressure transducer 50 connected to an orifice 46 on high pressure side 40 and to an orifice 47 on low pressure side 41. Each transducer 50 outputs a signal indicative of a pressure differential $\Delta p$ between orifices 46(2) and 47(2). Those signals are received by a controller as described below. As explained in application Ser. No. 13/837,262, values for $\Delta p$ correlate to loading on a blade at the location along the root-to-tip blade length where the $\Delta p$ is measured.

For convenience, the example of rotor 11 assumes that all components of a particular sensor 30 are located at the same distance R from the blade 20 root. This need not be the case, however. For example, orifices 46 and 47 of a sensor 30 might be located at a distance $R_A$ from the blade root and the pressure transducer 50 of that sensor may be located at a distance $R_B$ from the blade root, with $R_A \neq R_B$. In such a case, the output of the transducer 50 would be indicative of loads at distance $R_A$. As another example, orifice 46 may be located at a distance $R_{AA}$ and orifice 47 may be located at a distance $R_{AB}$, with $R_{AA} \neq R_{AB}$. In such a case, the output of transducer 50 would be indicative of loads at a distance between $R_{AA}$ and $R_{AB}$. As used herein, references to location of a differential pressure sensor refer to the location of the orifices at which that sensor measures pressures.

With regard to positioning of orifices along a chord length (i.e., in the direction generally perpendicular to blade radial length), the locations of orifices 46(2) and 47(2) suggested in FIG. 3B are merely one example of possible positioning. The positioning of such orifices may be generally dependent on the cross-sectional geometry of a blade at the location along the blade length where the sensor is to be placed. Similarly, sensors 30 need not be evenly spaced as shown in FIG. 3B.

Figure 4:
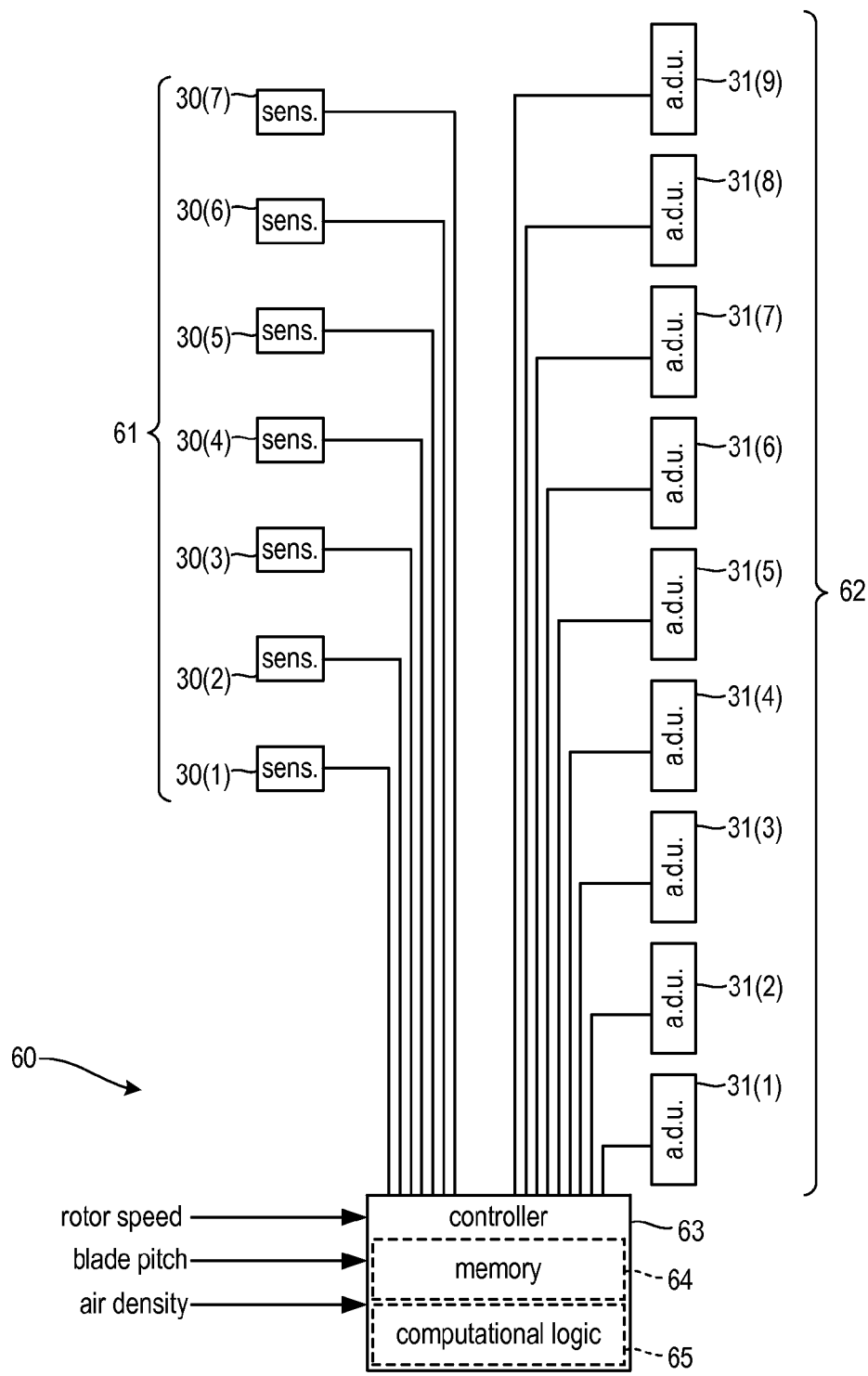
FIG. 4 is a block diagram of a control system of a wind turbine blade according to some embodiments.

FIG. 4 is a block diagram showing a control system 60 for blade 20 that includes a sensor array 61, an air deflector system 62, and a controller 63. Sensor array 61 is comprised of sensors 30. Each sensor 30 may communicate with controller 63 over a separate signal path. Although each of those signal paths is shown in FIG. 4 as a single line connecting a sensor 30 and controller 63, each path could include multiple wires and/or wireless channels. Air deflector system 62 is comprised of air deflector units 31. Each air deflector unit 31 receives actuation commands from controller 63 over a separate signal path. Although each of those signal paths is shown in FIG. 4 as a single line connecting an air deflector unit 31 and controller 63, each path could include multiple wires and/or wireless channels. For example, a pneumatically operated air deflector unit 31 may include multiple solenoid valves that receive control commands to extend or retract a deflector element 49.

Controller 63 includes one or more non-transitory machine-readable memories (storage media) 64 to store instructions and/or other data. Examples of non-transitory, machine-readable memory include, without limitation, hard disks (magnetic disk drives) and other magnetic storage devices, CD-ROMs and other optical storage devices, FLASH memory, and/or any combination thereof. The term "machine-readable memory" could also include an integrated circuit or other device having hard-coded instructions (e.g., logic gates) that configure the device to perform one or more operations.

Controller 63 also includes computational logic circuits 65 to perform computations and other operations of control methods described below. Controller 63 receives sensor data from each of sensors 30, and may also receive data from other sources. That data may include a value for a rotational speed of rotor 11, a value for a pitch of blade 20, and a value for an air density. Based on computations performed with input data, controller 63 generates and transmits actuation commands to each of air deflector units 31.

Controller 63 may be implemented utilizing any of various architectures. In some embodiments, controller 63 may be a general purpose computer in which logic circuits 65 include one or more programmable microprocessors that execute program instructions stored in memory 64. In some embodiments, controller 63 may be an application specific integrated circuit (ASIC) in which control instructions are hard-coded or in which some instructions are hard coded and some are executed after being read from memory. In yet other embodiments, controller 63 may include one or more field programmable gate arrays (FPGAs) or other type of programmable logic device. Controller 63 may also be implemented as a combination of a programmable general purpose computer and/or and one or more ASICs and/or one or more other types of computational device.

Each of blades 23 and 26 may include a control system similar to control system 60. The control systems of blades 23 and 26 may operate in parallel with, and in a manner similar to, that described for control system 60. However, the control system of each blade may operate independently of the control systems of the other blades. In some embodiments, the controller for each of blades 20, 23, and 26 is a separate hardware device. In other embodiments, the controllers for each of blades 20, 23, and 26 may be implemented in a single hardware device. For example, that device may simultaneously execute three independent programming threads. Each of those threads may correspond to, and perform the operations of, one of those controllers.

In the embodiment of FIG. 4, sensor array 61 includes all sensors 30 on blade 20 and air deflector system 62 includes all air deflector units 31 on blade 20. This need not be the case, however. In some embodiments, a control system for a blade may include a controller that only receives data from a portion of the sensors on a blade and/or that only sends actuation commands to a portion of the air deflector units on that blade. One or more other sensors on that blade may provide output to, and/or one or more other air deflector units on that blade may be controlled by, a separate controller.

As used herein, an "extension state" of an air deflector unit refers to a condition in which the deflector element of that air deflector unit has an amount of extension that is unique relative to other possible amounts of extension. For example, a zero extension state for air deflector unit 31(2) is a condition in which deflector element 49(2) is fully retracted, a 40% extension state is a condition in which deflector element 49(2) is extended 40% of its maximum extension distance h, etc. As also used herein, a "deployment configuration" is a combination of the extension states of each of multiple air deflector units in a group of air deflector units on a blade. For example, one deployment configuration for air deflector system 62 is a condition in which all air deflector units 31(1) through 31(9) are in a zero extension state. Another example of a deployment configuration is a condition in which air deflector unit 31(1) is in a 100% extension state and air deflector units 31(2) through 31(9) are in a zero extension state. Yet another deployment configuration is a condition in which air deflector units 31(1) and 31(2) are in a 100% extension state and air deflector units 31(3) through 31(9) are in a zero extension state. The preceding examples of extension states and deployment configurations are merely intended to help illustrate the concepts of these terms as used herein. A large number of other extension states and deployment configurations are possible in addition to those explicitly mentioned above. As explained in more detail below, deployment configurations of all blades on a rotor may be referred to collectively as a "collective deployment configuration."

In at least some embodiments, a set of deployment configurations that a controller may implement as part of a per-blade control method may be established in advance of performing that method. Based on computer simulations and/or testing of an actual wind turbine, a controller may be configured to operate an air deflector system to achieve desired levels of air deflector system activity, across ranges of wind and blade conditions, so as to maintain blade loading at appropriate levels. Moreover, and as discussed in further detail below, a controller may be configured to activate and deactivate air deflector units in a particular pattern (e.g., root-to-tip or tip-to-root) and/or only utilizing certain extension states. When subsequently placed into operation, the controller may calculate data values based at least in part on sensor data that corresponds to a particular loading condition or range of loading conditions. The controller may then generate actuator command signals to one or more air deflector units to implement a deployment configuration that corresponds to the calculated data value. In effect, the implemented deployment configuration was determined during controller configuration to be appropriate for the loading condition or range of loading conditions that resulted in the data value calculated during controller operation.

FIGS. 5, 8, 9, 11, 18 and 19 are block diagrams respectively showing "per-blade" control methods 100 through 400, 1500, and 1600 according to various embodiments. As used herein, a per-blade control method may be independently performed by controllers for each blade of a wind turbine rotor. The below descriptions of methods 100 through 400, 1500, and 1600 focus on controller 63 and blade 20. For an embodiment in which controller 63 is performing one of methods 100 through 400, 1500, and 1600, however, it is understood that controllers for blades 23 and 26 may independently, and in parallel with performance of a method by controller 63, perform that same method for blades 23 and 26, respectively.

Each of methods 100 through 400, 1500, and 1600 is a feedback loop. At the start of a current cycle n for such a method, a controller receives current sensor data from a sensor array on a rotating rotor blade having a current deployment configuration. That current deployment configuration may have been determined during a previous cycle n−1. The current sensor data is indicative of current loads on that blade. Using the current sensor data, the controller determines an updated deployment configuration appropriate for loads indicated by the current sensor data. The updated deployment configuration may be the same as or different from the current deployment configuration. At the conclusion of the current cycle n, the controller may then generate and transmit actuation commands to one or more of air deflector units to implement that updated deployment configuration. The next cycle n+1 then begins as the controller receives sensor data signals indicative of loads after the updated deployment configuration has been implemented.

Figure 5:
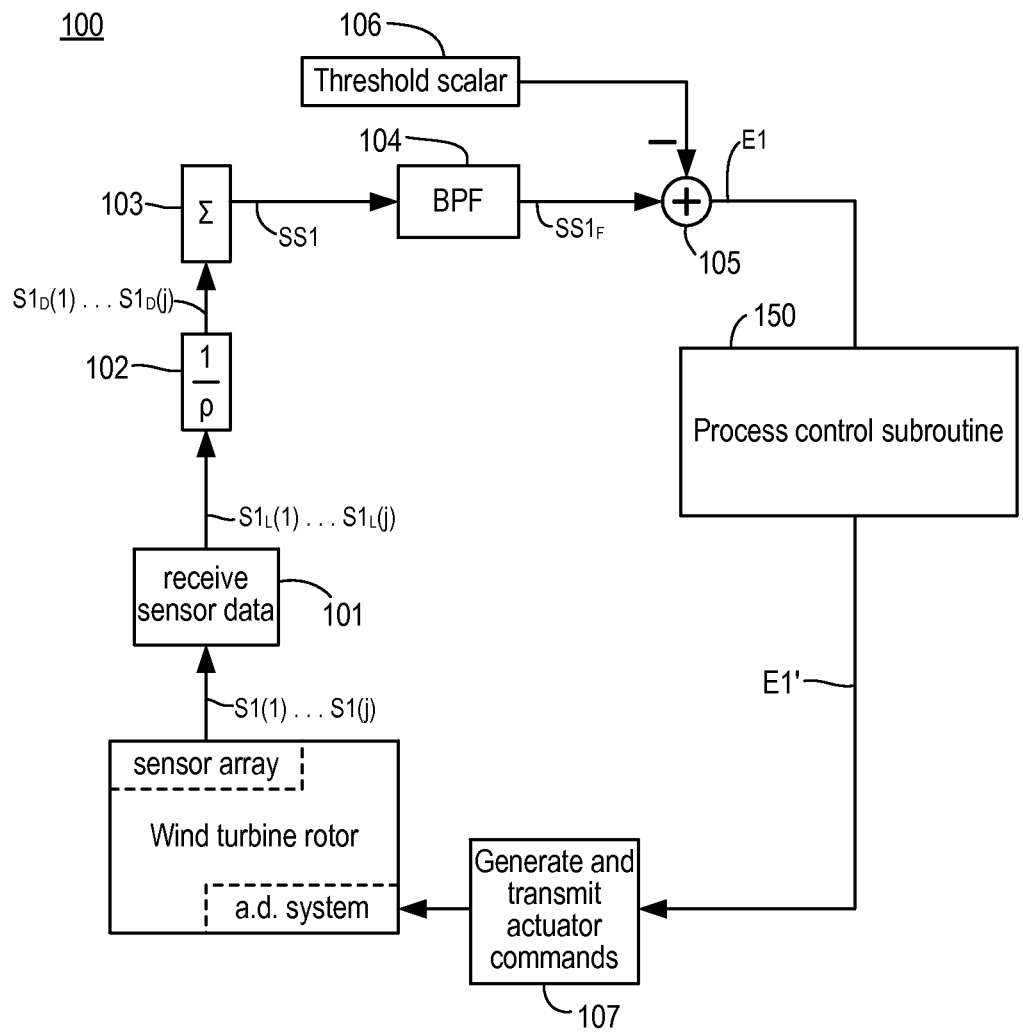
FIG. 5 is a block diagram showing a per-blade control method performed by a controller in some embodiments.

Turning to FIG. 5, at step 101 controller 63 receives sensor data values from sensor array 61. Those sensor data values are represented in FIG. 5 as variables $S1(1)$ through $S1(j)$. Throughout this description, a parenthetical portion of a variable name indicates that the variable has a value relating to a sensor or air deflector unit having a similar parenthetical reference number. For example, the $S1(1)$ value relates to sensor $30(1)$. Other numbers in variable names (e.g., the "1" immediately following the "S" in $S1(1)$) are used to help avoid confusion when similar variable names are used in connection with different drawing figures. Although j=7 in the embodiment of rotor 11 and control system 60, j may have a different value in other embodiments.

Each of variables $S1(1)$ through $S1(j)$ has a value that is indicative of a pressure differential at the location of the corresponding sensor 30. As indicated above, each of those pressure differentials also correlates with loading on blade 20 at the location along the blade 20 length where the pressure differential is measured. That loading includes the normal force $F_N$ on blade 20 in the direction perpendicular to the plane of rotor 11 rotation. When multiplied by a radial length R from the root of blade 20, each of those normal forces represents a contribution to the root bending load on blade 20. Because the location of each sensor 30 is fixed, the radial length R associated with each of sensors 30 is known. As part of step 101, controller 63 may multiply the $S1(1)$ through $S1(j)$ values by the radial length distances respectively associated with sensors $30(1)$ through $30(j)$. As indicated in FIG. 5 by the variables $S1_L(1)$ through $S1_L(j)$, the output of step 101 may be a set of location adjusted sensor data values. In other embodiments, radial length distances may be applied in other steps (e.g., as part of step 102, as a separate step between steps 102 and 103). In step 102, controller 63 divides each of the $S1_L(1)$ through $S1_L(j)$ values by p, the measured air density. In step 103, controller 63 sums the array of density-adjusted sensor values output from step 102 (represented in FIG. 5 as $S1_D(1)$ through $S1_D(j)$) and obtains a summed signal value (represented as variable SS1).

In some embodiments, and as shown in FIG. 5, the SS1 value may be band pass filtered in step 104. In some embodiments, the pass band of the filter may be selected so as to limit frequency content of the SS1 signal to frequencies approximately based on the rotor rotational speed. As a secondary benefit, high frequency noise in the SS1 signal may also be reduced.

The output of step 104 is a filtered summed signal value, represented in FIG. 5 as variable $SS1_F$. In step 105, a threshold scalar 106 is applied to the $SS1_F$ value. In particular, threshold scalar 106 is subtracted from the $SS1_F$ value to obtain a threshold-adjusted error value (represented as variable E1). Control method 100 includes an additional control subroutine 150 in which additional operations are performed on the error signal from step 105 to obtain a further revised output signal value (represented as variable E1'). Subroutine 150 may be a proportional (P) control subroutine, a proportional-derivative (PD) control subroutine, a proportional-integral (PI) control subroutine, a proportional-integral-derivative (PID) control subroutine, a linear-quadratic regulator (LQR) control subroutine, a linear-quadratic-Gaussian (LQG) control subroutine, an H-infinity control subroutine, or other type of control subroutine. Control subroutines of these and other types are well known and thus not further described herein. In some embodiments, subroutine 150 may be omitted.

Figure 6A:
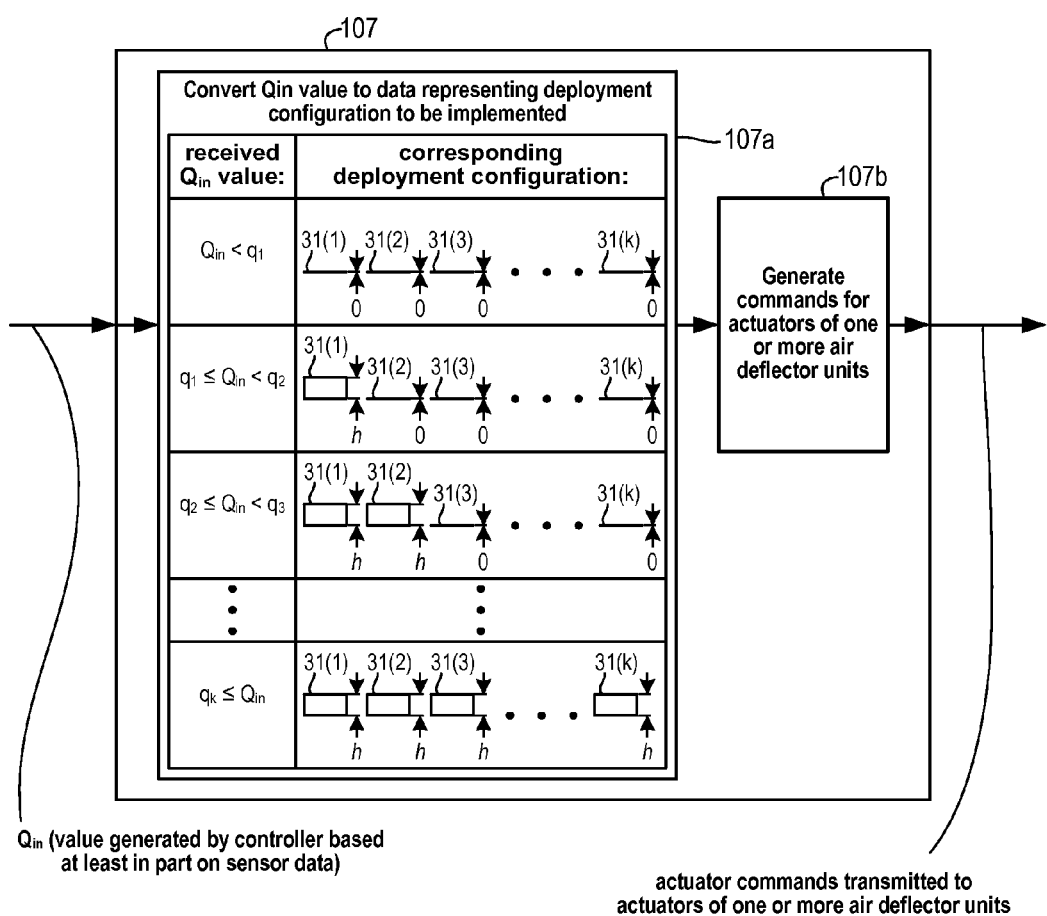
FIG. 6A is a block diagram illustrating generation of air deflector unit actuator commands according to some embodiments.
Figure 6B:
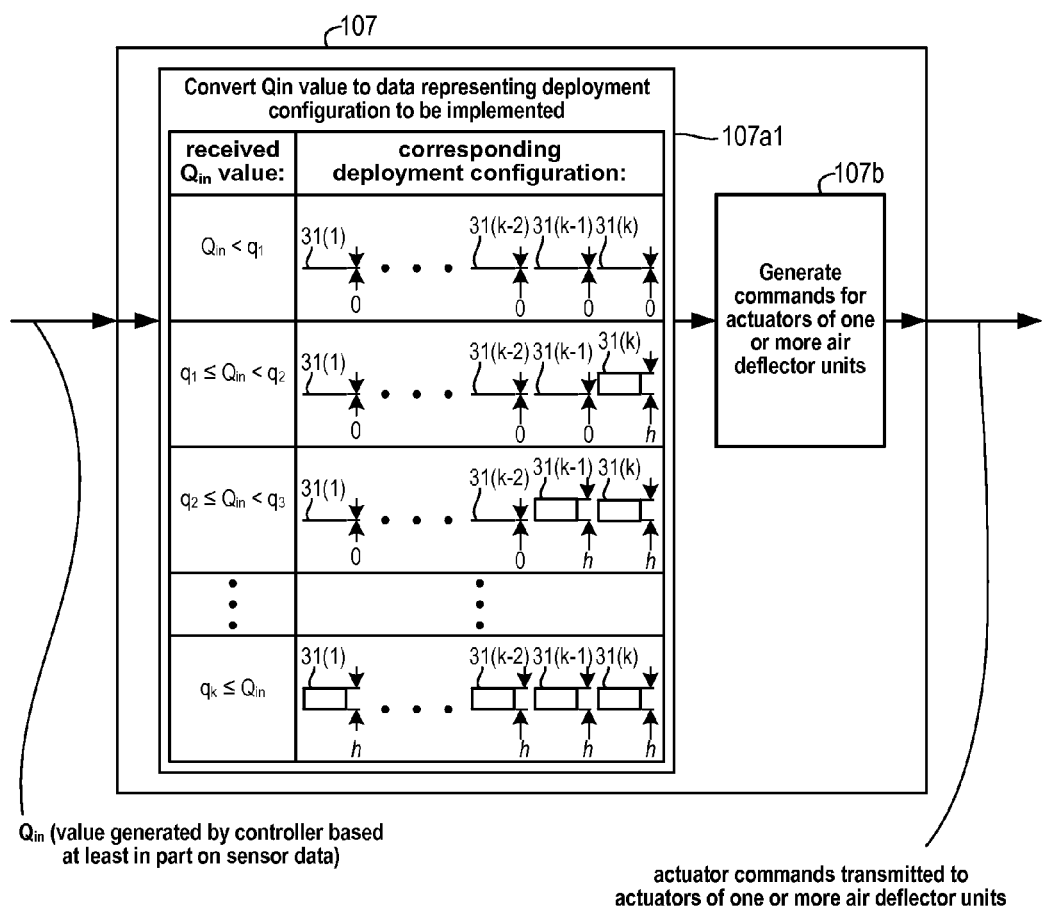
FIGS. 6B through 6D are block diagrams illustrating generation of air deflector unit actuator commands according to some additional embodiments.

In step 107, controller 63 generates commands to one or more of air deflector units 31 to implement a deployment configuration that corresponds to the value of E1'. FIGS. 6A through 6D are diagrams that describe operations of step 107 according to several embodiments. In FIGS. 6A through 6D, the input to step 107 is a computed data value represented by the variable $Q_{in}$. In the embodiment of method 100, the input to step 107 is the E1' value. Because operations such as those shown in FIGS. 6A through 6D may also be performed in various below-described embodiments using a data value computed in a manner different from that used to compute the E1' value, however, the more generic variable $Q_{in}$ is used in FIGS. 6A through 6D. Moreover, FIGS. 6A through 6B are described in connection with generating and transmission of actuation commands for an air deflector system having k air deflector units $31(1)$ through $31(k)$. Although k=9 in the embodiment of rotor 11 and control system 60, there may be fewer or more air deflector units in other embodiments.

In a first sub-step 107a, controller 63 converts a received $Q_{in}$ value into data that represents a corresponding deployment configuration, i.e., the extension states that air deflector units $31(1)$ through $31(k)$ should have based on the received $Q_{in}$ value. For convenience, the operations of sub-step 107a are represented as a table in FIG. 6A. Such operations can be implemented using a look-up table in some embodiments. As explained below, however, the operations of sub-step 107a can also be performed in some embodiments through use of one or more formulas or other techniques.

In the embodiment represented by FIG. 6A, controller 63 is configured to implement one of k deployment configurations. In those k deployment configurations, all air deflector units 31 are limited to one of two extension states: fully retracted (zero extension) or fully extended (100% extension).

For $Q_{in}$ values less than $q_1$, controller 63 converts the $Q_{in}$ value into data representing a deployment configuration in which each of air deflector units 31 has a zero extension state. For values of $Q_{in}$ greater than or equal to $q_1$ and less than $q_2$, controller 63 converts the $Q_{in}$ value into data representing a deployment configuration in which air deflector unit $31(1)$ is in a 100% extension state and in which all other air deflector units 31 are in a zero extension state. For values of $Q_{in}$ greater than or equal to $q_2$ and less than $q_3$, controller 63 converts the $Q_{in}$ value into data representing a deployment configuration in which air deflector units $31(1)$ and $31(2)$ are in a 100% extension state and in which all other air deflector units 31 are in a zero extension state. This pattern continues for additional ranges of $Q_{in}$, with $q_k \leq Q_{in}$ causing controller 63 to convert the $Q_{in}$ value into data representing a deployment configuration in which all k air deflector units 31 are in a 100% extension state.

In sub-step 107b, and based on the data into which the $Q_{in}$ value was converted, controller 63 generates commands for the actuators of one or more of air deflector units 31 to implement the corresponding deployment configuration. The form of those commands may depend on the type of actuation mechanisms employed, but may be readily be determined by persons of ordinary skill in the art based on information provided herein and based on the type of actuator mechanisms used. The generated actuator commands may then be transmitted to the actuators of the appropriate air deflector units 31.

Although FIG. 6A shows distinct sub-steps 107*a* and 107*b*, in some embodiments operations of sub-steps 107*a* and 107*b* may be combined.

In the embodiment of FIG. 6A, and as values of $Q_{in}$ rise, corresponding deployment configurations require actuation of additional air deflector units 31, in a root-to-tip direction, to extend deflector elements 49. As values of $Q_{in}$ fall, corresponding deployment configurations require actuation of additional air deflector units 31, in a tip-to-root direction, to retract deflector elements 49. In other embodiments, a controller may be configured to implement deployment configurations in a reverse manner. One example of this is shown in FIG. 6B, which shows an embodiment of step 107 in which sub-step 107*a* has been replaced with a sub-step 107*a*1. Similar to sub-step 107*a* in the embodiment of FIG. 6A, controller 63 may perform sub-step 107*a*1 so as to implement one of k different deployment configurations. In the embodiment of FIG. 6B, however, controller 63 is configured to execute these different configurations by actuating air deflector elements 31 in a tip-to-root direction when extending deflector elements 49 and in a root-to-tip direction when retracting deflector elements 49. For $Q_{in}<q_1$, controller 63 converts the $Q_{in}$ value into data representing a deployment configuration in which each of air deflector units 31 has a zero extension state. For $q_1 \leq Q_{in} < q_2$, controller 63 converts the $Q_{in}$ value into data representing a deployment configuration in which air deflector unit 31(*k*) located furthest from the blade root has a 100% extension state and the remaining air deflector units 31 have a zero extension state. For $q_2 \leq Q_{in} < q_3$, controller 63 converts the $Q_{in}$ value into data representing a deployment configuration in which air deflector units 31(*k*) and 31(*k*−1) have a 100% extension state, and all other air deflector units 31 have a zero extension state. This pattern continues, with $q_k \leq Q_{in}$ causing controller 63 to convert the $Q_{in}$ value into data representing a deployment configuration in which all air deflector units 31 have a 100% extension state.

Figure 6C:
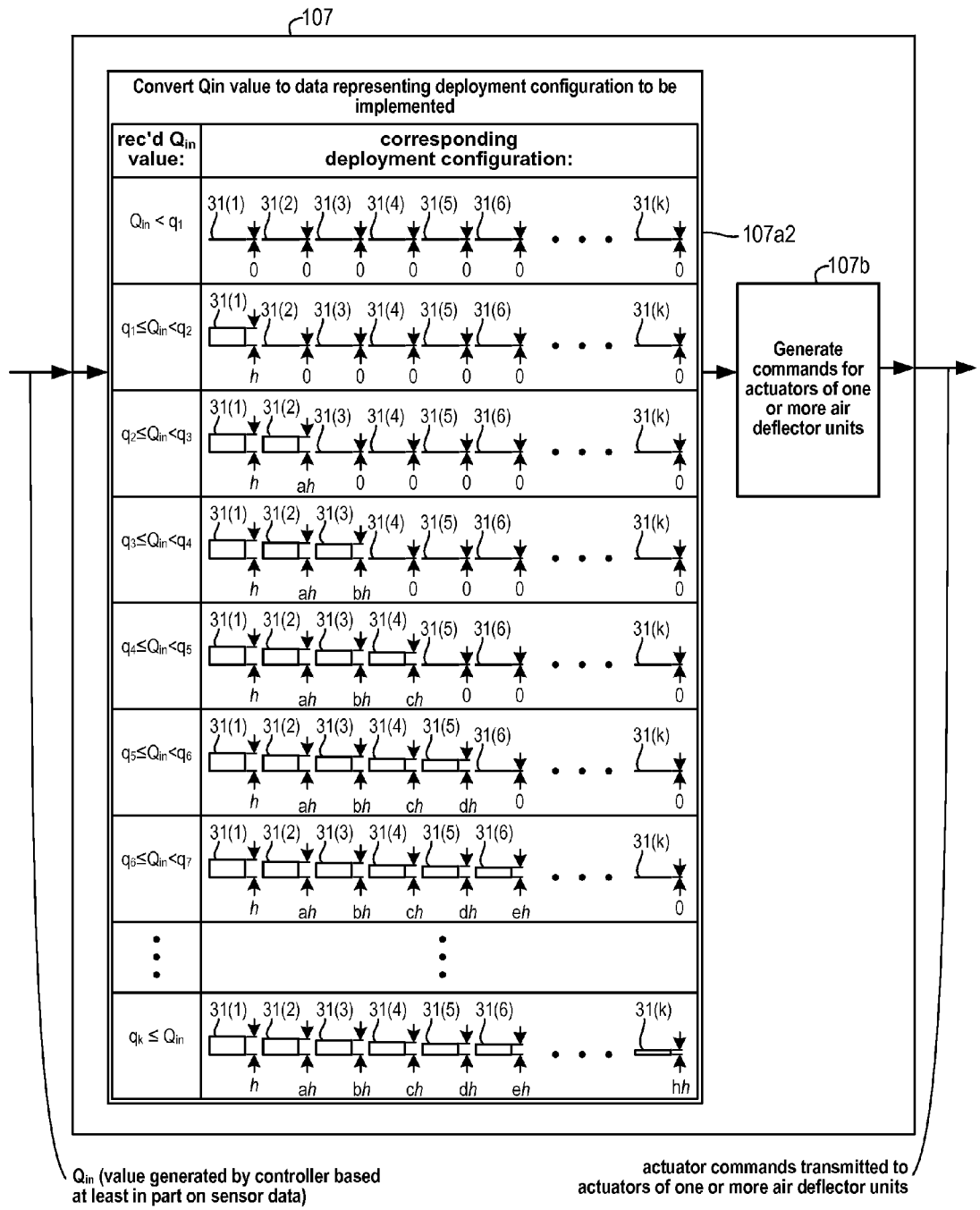

FIG. 6C illustrates step 107 according to some additional embodiments. In the embodiment of FIG. 6C, step 107 has been modified by replacing sub-step 107*a* with a sub-step 107*a*2, and controller 63 is again configured to implement k deployment configurations. Like the embodiment of FIG. 6A, all air deflector units 31 are limited to one of two extension states, with one of those extension states being fully retracted. Unlike the embodiment of FIG. 6A, however, the other of those states is less than maximum possible extension for at least some of air deflector units 49. In particular, the deflector element 49(2) of air deflector unit 31(2) is either fully retracted or extended a*h, where 0<a<1, the deflector element 49(3) of air deflector unit 31(3) is either fully retracted or extended b*h, where 0<b<a, etc.

Figure 6D:
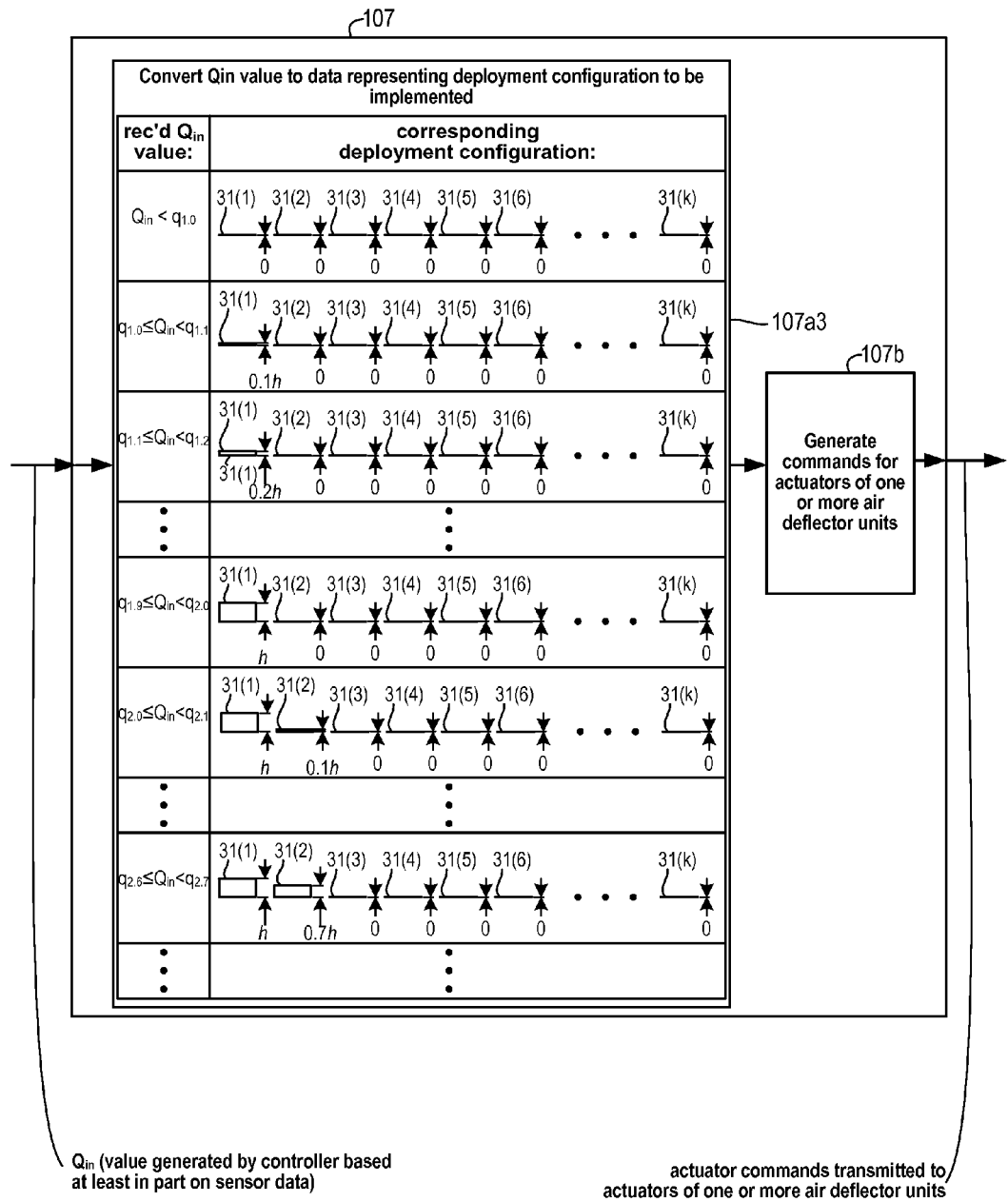

In still other embodiments, one or more air deflector units may have more than two possible extension states. This is partially illustrated in FIG. 6D. In the embodiment of FIG. 6D, step 107 has been modified by replacing sub-step 107*a* with a sub-step 107*a*3, and controller 63 is configured to implement (10*k)+1 deployment configurations. In those deployment configurations, air deflector units 31 may have an extension state ranging from zero extension to 100% extension in increments of 10%.

FIGS. 6A through 6D only show four examples of sets of deployment configurations that a controller may be configured to implement in the course of performing a particular control method. The examples of FIGS. 6A through 6D are not intended to represent a limitation on sets of implementable deployment configurations. As but one example, a controller may be configured to implement different deployment configurations based on a non-linear relationship to ranges of $Q_{in}$ values. For instance, ranges of $Q_{in}$ values mapped to different deployment configurations may be relatively large for lower values of $Q_{in}$ and relatively small for higher values of $Q_{in}$. As but another example, a controller may be configured so that certain air deflector units 31 remain in a zero extension state in all deployment configurations.

Although the operations of controller 103 illustrated in FIGS. 6A through 6D could be performed using lookup tables that map each of multiple ranges of input values to data representing specific deployment configurations, they could also be implemented in other manners. As but one example, the embodiment of FIG. 6A could be implemented by performing a function on $Q_{in}$ in sub-step 107*a* that outputs an integer value D that is between 0 through k (e.g., D=0 for $Q_{in}<q_1$, D=1 for $q_1 \leq Q_{in} < q_2$, etc.), with the D value then representing the number of air deflector units in the root-to-tip direction that are to be placed into a fully extended state. As another example, method 100 could be tuned (e.g., by setting an appropriate gain in subroutine 150) so that an E1' value of 1 corresponds to a deployment configuration in which air deflector unit 31(1) is in a fully extended state and the other air deflector units 31 are in a zero extension state, an E1' value of 2 corresponds to a deployment configuration in which air deflector units 31(1) and 31(2) are in a fully extended state and the other air deflector units 31 are in a zero extension state, etc., with an E1' value of k corresponding to a deployment configuration in which all air deflector units 31 are in a fully extended state. Step 107*a* could then include operations described by the following pseudo code:

If $Q_{in}<0$, set $Q_{in}=0$

If $Q_{in}>k$, set $Q_{in}=k$ $D=INT[Q_{in}]$

In the above pseudo code, "INT[ ]" is a function that returns the integer part of the argument in the brackets [ ], and the D value represents the number of air deflector units in the root-to-tip direction that are to be placed into a fully extended state. As but another example, method 100 could be tuned so that an E1' value of 1 corresponds to a deployment configuration in which air deflector unit 31(1) is in a fully extended state and the other air deflector units 31 are in a zero extension state, an E1' value of 2 corresponds to a deployment configuration in which air deflector units 31(1) and 31(2) are in a fully extended state and the other air deflector units 31 are in a zero extension state, etc., with an E1' value of k corresponding to a deployment configuration in which all air deflector units 31 are in a fully extended state. The above pseudo code could then be modified so that the last line is replaced with $D=ROUND[Q_{in}]$, where "ROUND[ ]" is a function that rounds the argument in the brackets up or down to the nearest integer.

In some embodiments such as those described in connection with FIGS. 6A through 6B, a negative $Q_{in}$ value is treated as corresponding to a deployment configuration in which all air deflector units have a zero extension state. In other embodiments, negative $Q_{in}$ values may be treated differently. For example, in some embodiments a wind turbine blade may include air deflector units on the high pressure side and air deflector units on the low pressure side. Positive $Q_{in}$ values could be processed to determine a deployment configuration in which only low pressure side air deflector units have non-zero extension states and negative $Q_{in}$ values could be processed to determine a deployment configuration in which only high pressure side air deflector units have non-zero extension states.

Figure 7:
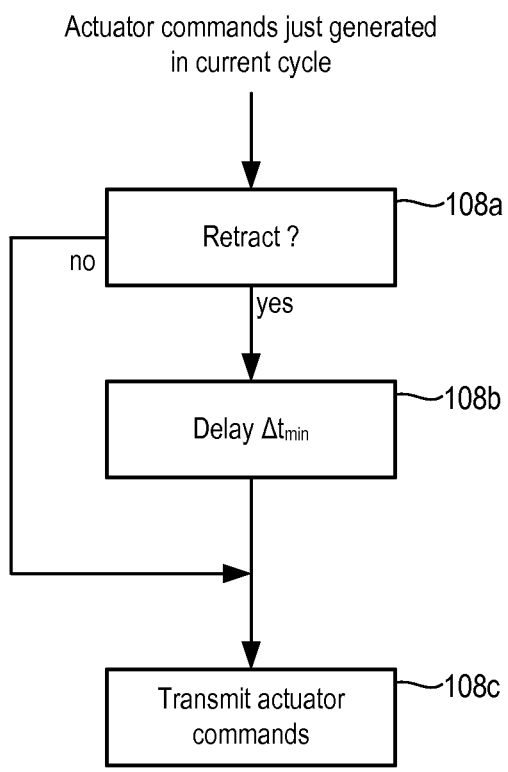
FIG. 7 is a flow chart showing a retraction rate limiting subroutine according to some embodiments.

In some embodiments, step 107 may include a deployment limitation subroutine to minimize "chatter" or other undesirably excessive air deflector unit activation. Examples of such subroutines include subroutines that utilize hysteresis and subroutines that utilize a dead-band. Another example is a retraction rate limit subroutine to reduce overly rapid retraction of deflector elements that may unduly wear air deflector unit components. FIG. 7 is a flow chart showing one example of a retraction rate limit subroutine performed after sub-step 107b. In sub-step 108a, controller 63 compares the just-generated actuator commands to the actuator commands generated in the immediately preceding cycle and which resulted in the current deployment configuration. If changing from the current deployment configuration to the updated deployment configuration corresponding to the just-generated actuator commands will require retraction of a deflector element, controller 63 proceeds on the "yes" branch to sub-step 108b. In sub-step 108b, controller 63 delays a time interval of $\Delta t_{min}$ before proceeding. From sub-step 108b, controller 63 proceeds to sub-step 108c and transmits the just-generated actuator commands. If controller 63 determines in sub-step 108a that changing from the current deployment configuration to the updated deployment configuration would not require retraction of a deflector element, controller 63 proceeds directly to sub-step 108c.

FIG. 7 is merely one example of a retraction rate limit subroutine. In other embodiments, a retraction rate limit subroutine may include alternate and/or additional sub-steps. For example, the time interval $\Delta t_{min}$ applied in sub-step 108b could be variable (e.g., longer $\Delta t_{min}$ under some conditions and shorter $\Delta t_{min}$ under other conditions). In some embodiments, a retraction rate limit subroutine may only limit retraction rate for a predetermined number of cycles of a control method, after which no limit is applied. In some embodiments, a retraction rate limit subroutine may be performed after sub-step 107a (or after one of sub-steps 107a1, 107a2, or 107a3, or after a similar sub-step) and prior to sub-step 107b. In such an embodiment, sub-step 108a may be modified to include a comparison of the data into which the $Q_{in}$ value was converted to similar data from a previous cycle, and sub-step 108c may be modified to include a continuation to sub-step 107b. In some embodiments, retraction rate limiting is not used.

The form of actuator command signals generated and transmitted by controller 63 in step 107 may vary in different embodiments. In some embodiments, for example, and as described above, air deflector units 31 may be pneumatically actuated. In some such embodiments, controller 63 may generate actuator command signals that cause air valves associated with the appropriate air deflector units 31 to open or close so as to extend or retract one or more deflector elements 49 and implement an updated deployment configuration. In embodiments in which deflector elements 49 are extended and retracted by electrically powered servos, controller 63 may generate actuator command signals that cause electrical motors in one or more air deflector units 31 to extend or retract a deflector element 49 an amount needed to implement the desired deployment configuration. In some embodiments, each of one or more air deflector units 31 may include a feedback sensor that transmits a signal to controller 63 indicative of the amount to which the deflector element 49 of that unit is extended, and controller 63 may use those signals to adjust the actuator command signals.

In some embodiments, controller 63 may generate and transmit actuator command signals regardless of whether the updated deployment configuration is different from the current deployment configuration. In other embodiments, controller 63 may first determine if the updated deployment configuration is different from the current deployment configuration. If not, no actuation signals are generated or transmitted. If the updated and current deployment configurations are different, the required controller actuation signals are generated and transmitted.

Values for reference scalar 106 will vary based on specific wind turbine models, location, and control objectives. In some embodiments, for example, the control objective may be reduction of gust loading in a particular portion of a power curve for the turbine in question. A wind turbine power curve is a plot of output power on the Y axis versus wind speed on the X axis. Typically, a power curve is divided into three regions. Region I is a flat portion of the curve from zero wind speed to a wind speed at which the rotor begins to turn and power generation begins. Region II is an S-shaped portion of the curve that corresponds to increased output power as wind speed increases, but where the turbine is producing less than full rated power. In region II, wind speed is not high enough for the turbine to generate its full rated power, and blades may have minimum pitch so as to extract more energy from the wind. Region III is a flat portion of the curve at which the wind turbine is producing maximum rated power and at which additional energy from increased wind speed is often dumped by pitching the rotor blades. The "knee," which is sometimes called "region 2.5," is the portion of the power curve around the transition from region II to region III and is often of greater interest for control purposes.

A reference scalar 106, as well as other parameters of method 100, can be determined, given a particular wind turbine, location, and control objective, using computer simulations. Such simulations can be performed using the well-known FAST (Fatigue, Aerodynamics, Structures, and Turbulence) software package created by the National Renewable Energy laboratory of the U.S. Department of Energy. A first set of simulations can be performed to obtain baseline data that models blade loading under a wide range of wind conditions and with all air deflector units in a zero deployment state. Initial values for threshold 106 can be selected by observing the baseline data and behavior under various load conditions, and by selecting the initial value based on a mean and standard deviation calculated from the baseline data. The threshold can be adjusted after further performance observations. Reference scalar 106 and other parameters of method 100 can also be determined and/or verified using testing of an actual wind turbine, or by a combination of simulation and actual wind turbine tests. If control subroutine 150 is included, its parameters may be tuned using conventional techniques used for tuning the appropriate type of control subroutine in other types process control applications.

Figure 8:
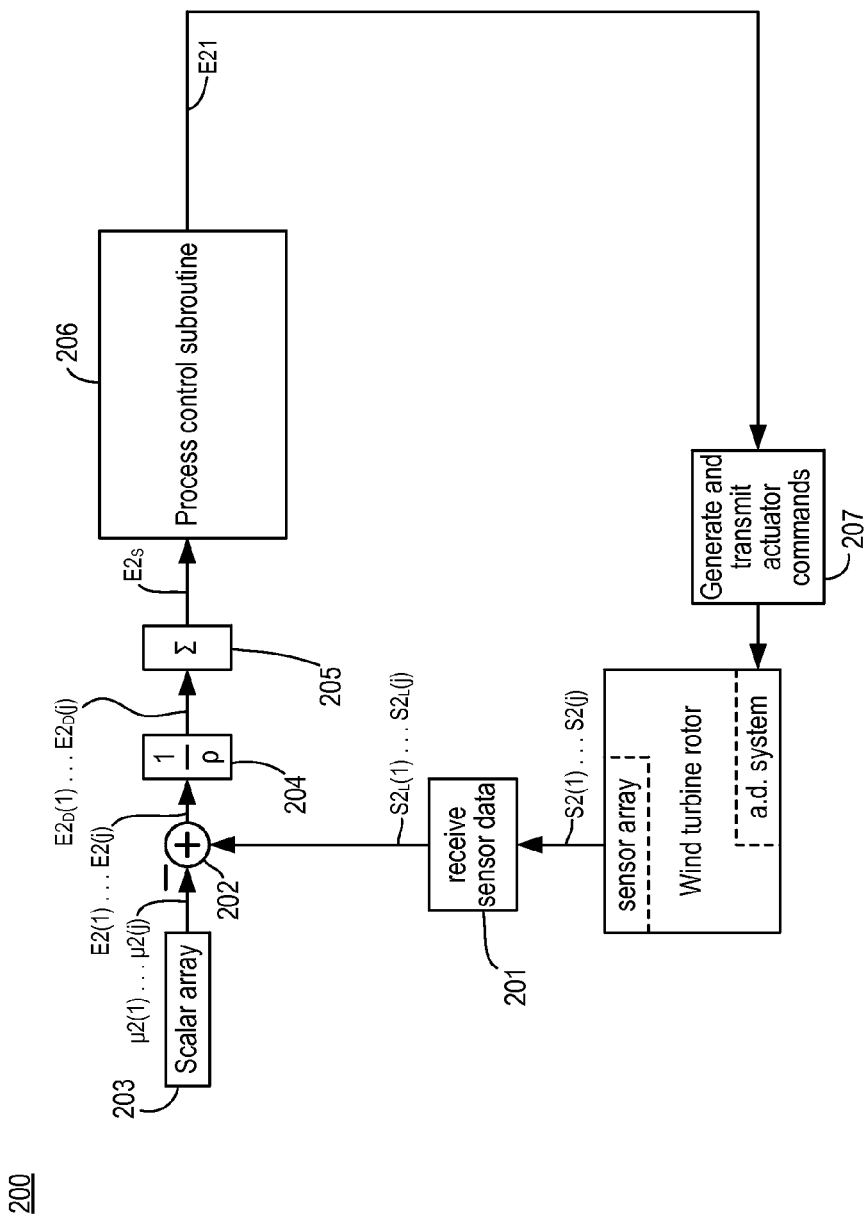
FIG. 8 is a block diagram showing a per-blade control method performed by a controller in some embodiments.

FIG. 8 is a block diagram showing a per-blade control method 200. Step 201 is similar to step 101 of control method 100. In step 201, controller 63 receives sensor data values S2(1) through S2(j) from sensor array 61. Each variable S2 has a value indicative of a pressure differential, and thus blade loading, at a corresponding sensor location. As part of step 201, controller 63 may multiply the S2(1) through S2(j) values by the radial length distances of each sensor and output a set of location adjusted sensor data values (represented as variables $S2_L(1)$ through $S2_L(j)$). In other embodiments, radial length distances may be applied in other steps (e.g., as part of step 204, as a separate step between steps 204 and 205).

In step 202, an array 203 of threshold scalars is applied to the adjusted sensor data values output from step 201. Array 203 comprises threshold scalar values μ2(1) through μ2(j) respectively corresponding to sensors 30(1) through 30(j). The output of step 202 may comprise an array of error values (represented as variable E2) in which $E2(1)=S2_L(1)-\mu2(1)$, $E2(2)=S2_L(2)-\mu2(2)$, ... $E2(j)=S2_L(j)-\mu2(j)$. In step 204, each of the E2(1) through E2(j) values is divided by the measured air density ρ to yield an array of density-adjusted error values (represented as variables $E2_D(1)$ through $E2_D(j)$). In step 205, controller 63 sums the array of $E2_D(1)$ through $E2_D(j)$ values output from step 204 and obtains a summed error signal value (represented as variable $E2_S$).

Control method 200 includes an additional control subroutine 206 in which additional operations are performed on the summed error signal value from step 205 to obtain a further revised output signal value (represented as variable E21). Subroutine 206 may be a proportional (P) control subroutine, a proportional-derivative (PD) control subroutine, a proportional-integral (PI) control subroutine, a proportional-integral-derivative (PID) control subroutine, a linear-quadratic regulator (LQR) control subroutine, a linear-quadratic-Gaussian (LQG) control subroutine, an H-infinity control subroutine, or other type of control subroutine. Control subroutines of these and other types are well known and thus not further described herein. In some embodiments, subroutine 206 may be omitted.

In step 207, controller 63 may then generate and transmit actuation command signals based on the E21 value. The operations of step 207 may be similar to those described in connection with step 107 of control method 100.

Given a particular wind turbine, location, and control objective, values for threshold scalars and for other parameters of method 200 can be determined using computer simulations and/or testing of an actual wind turbine in a manner similar to that discussed in connection with method 100. If control subroutine 206 is included, its parameters may be tuned using conventional techniques used for tuning the appropriate type of control subroutine in other types process control applications.

Figure 9:
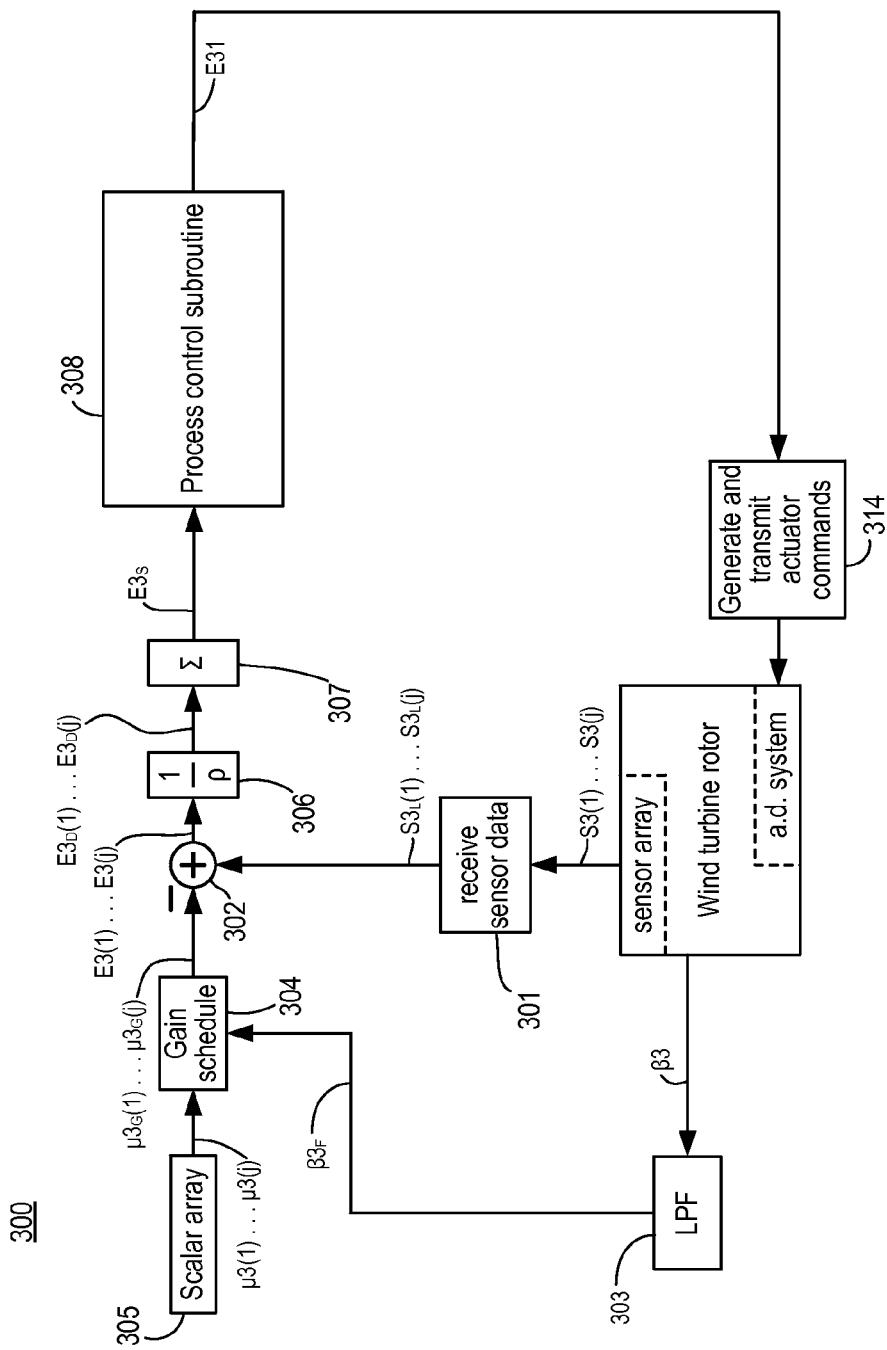
FIG. 9 is a block diagram showing a per-blade control method performed by a controller in some embodiments.

FIG. 9 is a block diagram showing a per-blade control method 300. In step 301, and similar to step 101 of method 100, controller 63 receives sensor data values (represented in FIG. 9 by variables S3(1) through S3(j)) from sensor array 61 and may multiply those values by radial length distances to obtain a set of location adjusted sensor data values (represented by variables $S3_L(1)$ through $S3_L(j)$). In other embodiments, radial length distances may be applied in other steps (e.g., as part of step 306, as a separate step between steps 306 and 307). In step 302, and similar to step 202 of method 200, controller 63 may apply threshold scalars to the $S3_L(1)$ through $S3_L(j)$ values. Unlike method 200, however, the values of those threshold scalars may vary based on the pitch of blade 20.

During each cycle of method 300, and in addition to the data values received from sensor array 61, controller 63 receives a data value β3 representing the current pitch of blade 20. The β3 value may optionally be filtered by a low pass filter in step 303 to eliminate sensor noise and prevent or limit response based on high frequency variations in blade pitch. A filtered β3 value (represented by variable $\beta3_F$) is then input to a gain schedule step 304.

Figure 10:
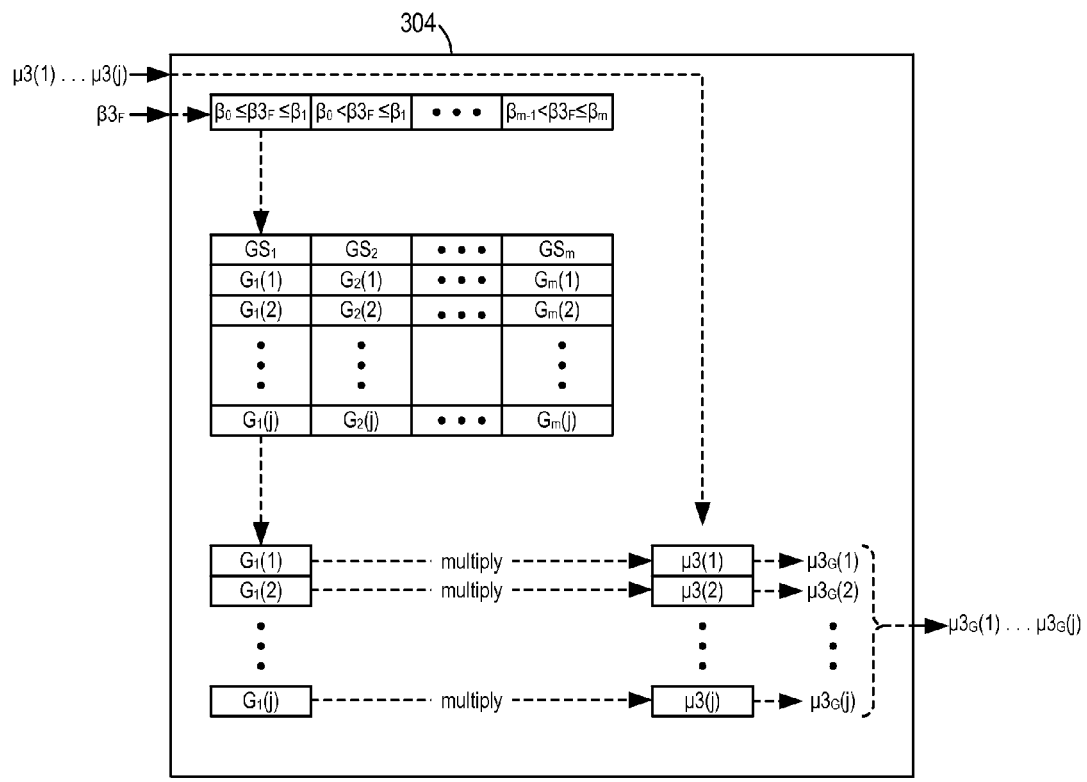
FIG. 10 is a block diagram of a gain schedule operation performed by a controller according to some embodiments.

In step 304, controller 63 applies gains to each of threshold scalars μ3(1) through μ3(j) in array 305. Operation of step 304 according to some embodiments is illustrated in FIG. 10. In response to the input value $\beta3_F$, controller 63 selects one of m gain schedules $GS_1$ through $GS_m$ corresponding to that $\beta3_F$ value. In response to an input $\beta3_F$ value greater than or equal to $\beta_0$ and less than or equal to $\beta_1$, for example, controller 63 may select gain schedule $GS_1$. If an input $\beta3_F$ value is greater than $\beta_1$ and less than or equal to $\beta_2$, controller 63 may select gain schedule $GS_2$. This may continue for additional ranges of $\beta3_F$ values, with controller selecting gain schedule GSm if an input $\beta3_F$ value is greater than $\beta_{m-1}$ and less than or equal to $\beta_m$.

Each of gain schedules $GS_1$ through $GS_m$ may include a set of j gain values. For example, gain schedule $GS_1$ includes gain values $G_1(1)$ through $G_1(j)$, gain schedule $GS_2$ includes gain values $G_2(1)$ through $G_2(j)$, etc. Although all gain values in a particular gain schedule may be different from one another, this need not be the case. In some embodiments, one or more gain values in a particular gain schedule may be the same. For example, in some embodiments it might be desirable to ignore sensor data from some sensors under some pitch conditions. In such an embodiment, gain values corresponding to threshold scalars for those sensors could be set to zero in a gain schedule corresponding to those pitch conditions.

After selecting a gain schedule, controller 63 multiplies each of scalars μ3(1) through μ3(j) by its corresponding gain in the selected gain schedule to obtain an array of gain-adjusted scalar values $\mu3_G(1)$ through $\mu3_G(j)$. FIG. 10 shows an example in which gain schedule $GS_1$ is selected in response to a $\beta3_F$ value greater than or equal to $\beta_0$ and less than or equal to $\beta_1$. In the example, $\mu3_G(1)=\mu3(1)*G_1(1)$, $\mu3_G(2)=\mu3(2)*G_1(2)$, ... $\mu3_G(1)=\mu3(j)*G_1(j)$.

Although FIG. 10 shows selection of a gain schedule using a look-up table, in some embodiments, gain schedule selection may be implemented in another manner. For example, gain schedule step 304 could include calculations using one or more formulas that receive a μ3 value and a $\beta3_F$ value as inputs and that output a $\mu_G$ value. As another example, gain schedule step 304 could utilize a combination of a look-up table and calculations (e.g., interpolation between values in a look-up table).

The $\mu3_G(1)$ through $\mu3_G(j)$ values are provided as an input to step 302 (FIG. 9). In step 302, $\mu3_G(1)$ through $\mu3_G(j)$ values are subtracted from the location-adjusted sensor data values output from step 301. The output of step 302 may comprise an array of error values (represented by variables E3) in which $E3(1)=S3_L(1)-\mu3_G(1)$, $E3(2)=S3_L(2)-\mu3_G(2)$, ... $E3(j)=S3_L(j)-\mu3_G(j)$.

The remaining steps in method 300 are similar to steps 204 through 207 in method 200. Each of the E3(1) through E3(j) values from step 302 is divided by the air density ρ in step 306, with the resulting density-adjusted error values (represented by variables $E3_D(1)$ through $E3_D(j)$) summed in step 307 to obtain an error value (represented by variable $E3_S$). Control method 300 includes an additional control subroutine 308 in which additional operations are performed on the summed error signal value from step 307 to obtain a further revised output signal value (represented as variable E31). Subroutine 308 may be a proportional (P) control subroutine, a proportional-derivative (PD) control subroutine, a proportional-integral (PI) control subroutine, a proportional-integral-derivative (PID) control subroutine, a linear-quadratic regulator (LQR) control subroutine, a linear-quadratic-Gaussian (LQG) control subroutine, an H-infinity control subroutine, or other type of control subroutine. In some embodiments, subroutine 308 may be omitted. The E31 value may then be applied as an input to step 314. The operations of step 314 may be similar to those described in connection with step 107 of method 100.

In the embodiment of FIG. 9, the input to gain schedule step 304 is a filtered value of blade pitch. In other embodiments, the input to a gain schedule step may be a different input that is representative of turbine operating condition. Examples of such inputs include, without limitation, values based at least in part on rotor speed and values based at least in part on wind speed.

As can be appreciated from the above, per-blade control methods such as method 300 further facilitate configurations in which the control system is more (or only) active under certain conditions. For example, gain schedules can be chosen so as to make the control system more active at higher wind speeds in region III. When operating in region III, blades of a wind turbine may have larger pitch values as pitch is increased to dump excess wind energy.

Given a particular wind turbine, location, and control objective, values for threshold scalars, gain schedules, and other parameters of method 300 can be determined using computer simulations and/or testing in a manner similar to that described above for other methods. If control subroutine 308 is included, its parameters may be tuned using conventional techniques used for tuning the appropriate type of control subroutine in other types process control applications.

Figure 11:
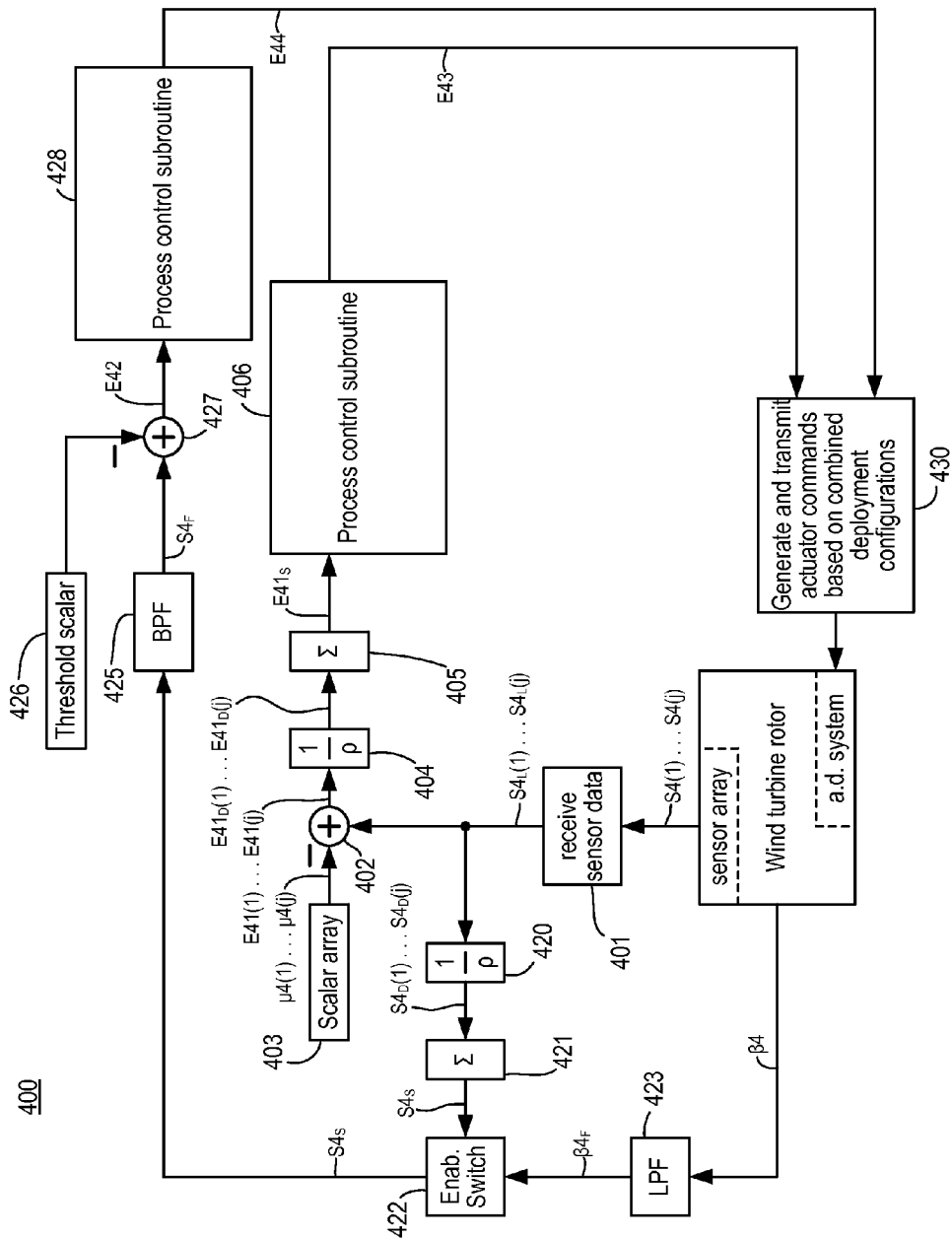
FIG. 11 is a block diagram showing a per-blade control method performed by a controller in some embodiments.

FIG. 11 is a block diagram showing a per-blade control algorithm 400 that combines features of control algorithm 200 (FIG. 8) and control algorithm 100 (FIG. 5). Step 401 is similar to steps 101, 201 and 301 of control methods 100, 200, and 300, respectively. In step 401, controller 63 receives sensor data values (represented as variables $S4(1)$ through $S4(j)$) from sensor array 61 and may multiply those values by the sensor radial length distances to obtain a set of location adjusted sensor data values (represented as variables $S4_L(1)$ through $S4_L(j)$). In other embodiments, radial length distances may be applied in other steps (e.g., as part of steps 404 and 420, as a separate step between steps 404 and 405 and a separate step between steps 420 and 421). In step 402, similar to step 202, an array 403 of threshold scalars $\mu4(1)$ through $\mu4(j)$ is applied to the $S4_L(1)$ through $S4_L(j)$ values from step 401 to obtain an array of error values (represented as variables E41), with $E41(1)=S54_L(1)-\mu4(1), \ldots E41(j)=S4_L(j)-\mu4(j)$.

Each of the $E41(1)$ through $E41(j)$ values from step 402 is divided by the air density $\rho$ in step 404, with the resulting density-adjusted error values (represented as variables $E41_D(1)$ through $E41_D(j)$) summed in step 405 to obtain a summed error value (represented as variable $E41_S$). The $E41_S$ value may be further processed by an additional control subroutine 406 to obtain a further revised output signal value (represented as variable E43). That E43 value is then provided to step 430, described below.

When the $S4_L(1)$ through $S4_L(j)$ values are input to step 402, those values are also divided by the air density $\rho$ in step 420 to obtain a set of density-adjusted sensor values (represented as variables $S4_D(1)$ through $S4_D(j)$), which values are summed in step 421 to obtain a summed error signal value (represented as variable $S4_S$). During each cycle of method 400, and in addition to the data values received from sensor array 61, controller 63 receives a value for the current pitch of blade 20 (represented as variable $\beta4$). The $\beta4$ value may be filtered by a low pass filter in step 423. Controller 63 uses a filtered $\beta4$ value (represented as variable $\beta4_F$) in switch step 422 to determine whether to further process the $S4_S$ value. If the $\beta4_F$ value is not within one or more predetermined ranges, the $S4_S$ value is not further processed. If the $\beta4_F$ value is within the one or more predetermined ranges, the $S4_S$ value is further processed in step 425.

In step 425, controller 63 band pass filters the $S4_S$ value in a manner similar to step 104 of method 100. A threshold scalar 426 is then subtracted from the resulting filtered signal value (represented as variable $S4_F$) at step 427. The result is an error value (represented as variable E42). The E42 value may be further processed by an additional control subroutine 428 to obtain a further revised output signal value (represented as variable E44). That E44 value is then provided to step 430.

Each of control subroutines 406 and 428 may be a proportional (P) control subroutine, proportional-derivative (PD) control subroutine, a proportional-integral (PI) control subroutine, a proportional-integral-derivative (PID) control subroutine, a linear-quadratic regulator (LQR) control subroutine, a linear-quadratic-Gaussian (LQG) control subroutine, an H-infinity control subroutine, or other type of control subroutine. Control subroutines 406 and 408 need not be the same type of control subroutine. One or both of control subroutines 406 and 408 may be omitted in some embodiments.

In some embodiments, controller 63 may be configured to implement one of a first set of deployment configurations based on the portion of method 400 that obtains the E43 value and to implement one of a second set of deployment configurations based on the portion of method 400 that obtains the E44 value. For any given set of blade loading conditions, the corresponding deployment configuration from the first set may be different from the corresponding deployment configuration from the second set. If the E44 value were ignored, for example, the output of step 430 across the range of possible E43 values would be actuator command signals that implement a deployment configuration from the first set. Conversely, if the E43 value were ignored, the output of step 430 across the range of possible E44 values would be actuator command signals that implement a deployment configuration from the second set. For any given set of blade loading conditions, the corresponding deployment configuration from the first set may be different from the corresponding deployment configuration from the second set. As part of step 430, controller 63 generates and transmits one or more actuator command signals that implement a deployment configuration that represents a combination of the requirements of the deployment configurations that might result if the E43 and E44 values were considered separately.

In some embodiments, a combined deployment configuration resulting from combining requirements of first and second deployment configurations requires extension of the deflector element of each air deflector unit by the maximum amount required by either of the first and second deployment configurations. As one example of this type of maximum-based deployment configuration combining, a first deployment configuration may be part of a root-to-tip deployment configuration pattern similar to that of FIG. 6A and a second deployment configuration may be part of a tip-to-root deployment configuration pattern similar to that of FIG. 6B. The first deployment configuration, which is based on the E43 value received in a current cycle, may require a 100% extension state for air deflector units 31(1) and 31(2) and zero extension state for all other air deflector units 31. The second deployment configuration, which is based on the E44 value received in a current cycle, may require a 100% extension state for air deflector units 31(*k*−1) and 31(*k*) and zero extension state for all other air deflector units 31. In a combined deployment configuration, air deflector units 31(1), 31(2), 31(*k*−1), and 31(*k*) may have a 100% extension state and all other air deflector units may have a zero deflection state.

As another example of a maximum-based combined deployment configuration, a first deployment configuration may be part of a deployment configuration pattern similar to that of FIG. 6D and a second deployment configuration may be part of a deployment configuration pattern that is also similar to that of FIG. 6D, but for which the deflector elements are extended at a different rates in response to increasing values of input signal $Q_{in}$. The first deployment configuration may require that a deflector element 49 of a particular air deflector unit 31 be extended by 40%. The second deployment configuration may require that the deflector element 49 of that air deflector unit 31 be extended by 70%. The combined deployment configuration may require that the deflector element 49 of that air deflector unit 31 be extended by 70%.

A combined deployment configuration could alternatively be based on the minimum of the requirements of two deployment configurations. For example, a first deployment configuration may require 100% extension of an air deflector unit and a second deployment configuration may require zero extension of that air deflector unit. In the combined deployment configuration, that air deflector unit may have a zero extension state.

A combined deployment configuration may alternatively be based on a sum of requirements. For example, a combined deployment configuration may require that the extension state for an air deflector unit be the lesser of (i) a sum of the extensions required by two deployment configurations, or (ii) the maximum extension possible (i.e., 100% of h).

In some embodiments, a combined deployment configuration may be determined in yet another manner. For example, a first deployment configuration may require extending a deflector element 49 by 30% and a second deployment configuration may require extending that same deflector element 49 by 90%. The combined deployment configuration may require extension of that deflector element by an amount (60%) that represents an average of the amounts required by the first and second deployment configurations. In still other embodiments, a method other than simple averaging between two extensions amounts may be used. As but one example, the average may be weighted based on one or more factors.

The above examples are of individual-basis combined deployment configurations. In particular, an extension state for a particular air deflector unit in a combined deployment configuration in one of the above examples is based solely on the extension requirements for that air deflector unit in the deployment configurations being combined. In some embodiments, a combined deployment configuration may be determined on a group basis. In a group-basis combination, the extension state of an air deflector unit in the combined deployment configuration is based on the extension requirements for multiple air deflector units in the deployment configurations that are being combined.

As one example of group-based combining, a combined deployment configuration may be determined by averaging the number air deflector units having a non-zero extension state in the first deployment configuration and the number of air deflector units having a non-zero extension state in the second deployment configuration. In the combined deployment configuration, that average number of air deflector units may then have a non-zero extension state. For example, a first deployment configuration may require air deflector units 31(1) and 31(2) to have a 100% extension state and the other air deflector units to have a zero extension state. A second deployment configuration may require air deflector units 31(1) through 31(4) to have a 100% extension state and the other air deflector units to have a zero extension state. The combined deployment configuration may require air deflector units 31(1) through 31(3) to have a 100% extension state and the other air deflector units to have a zero extension state.

Averaging of deployments of two deployment configurations could be performed in other ways. For example, a first deployment configuration may require air deflector unit 31(1) to have a 100% extension state, air deflector unit 31(2) to have a 50% extension state, and remaining air deflector units 31 to have a 0% extension state. A second deployment configuration may require that air deflector units 31(1) through 31(3) have a 100% extension state, air deflector unit 31(4) to have a 30% extension state, and remaining air deflector units 31 to have a 0% extension state. The total percentage of extension required by the first deployment configuration (100%+50%=150%) and the total percentage of extension required by the second deployment configuration (100%+100%+100%+30%=330%) could then be averaged (240%). The combined deployment configuration could then require deployment of air deflector units to obtain that averaged deployment percentage, e.g., a 100% extension state for air deflector units 31(1) and 31(2), a 40% extension state for air deflector unit 31(3), and a 0% extension state for remaining air deflector units 31.

Some embodiments may include variations on the above combining techniques. For example, the first deployment configuration may extend air deflector units 31 in a root-to-tip pattern and the second deployment configuration may extend air deflector units 31 in a tip-to-root pattern. The combined deployment configuration may then extend air deflector units 31 in both a root-to-tip and tip-to-root pattern. The averaged deployment percentage may be evenly distributed. If the previous example is modified such that the second deployment configuration requires air deflector units 31(*k*−2) through 31(*k*) to have a 100% extension state, air deflector unit 31(*k*−3) to have a 30% extension state, and remaining air deflector units 31 to have a 0% extension state, a combined deployment configuration may require air deflector units 31(1) and 31(*k*) to have a 100% extension state, air deflector units 31(2) and 31(*k*−1) to have a 20% extension state, and remaining air deflector units 31 to have a 0% extension state. Alternatively, the distribution of the averaged deployment percentage could be weighted based on the total deployment percentages of the first and second deployment configurations. Again using the example in which the first deployment configuration requires 100%, 50%, 0% ... 0% extension states for air deflector units 31(1) through 31(*k*), respectively, and in which the second deployment configuration requires 0%, ... 30%, 100%, 100%, 100% extension states for air deflector units 31(1) through 31(*k*), respectively, the combined deployment configuration may require (150/480)*240%=75% of the averaged deployment percentage allocated to a 75% extension state of air deflector unit 31(1), (330/480)*240%=165% of the averaged deployment percentage allocated to a 100% extension state of air deflector unit 31(k) and a 65% extension state of air deflector unit 31(k−1), and a 0% extension state of other air deflector units 31.

The above merely represent several examples. Group-based combination may be performed in numerous other manners in other embodiments. In some embodiments, extension requirements in a group-basis combined deployment configuration may be determined by summing the requirements of the deployment configurations being combined. For example, a first deployment configuration may require 100% extension states for two air deflector units and zero extension states for remaining air deflector units. A second deployment configuration may require 100% extension states for one air deflector unit and zero extension states for remaining air deflector units. The combined deployment configuration may require a 100% extension state for three air deflector units and zero extension states for remaining air deflector units. As but one further example, two deployment configurations could be combined such that the deployment percentage in the combined deployment configuration is the sum of the deployment percentages of the two deployment configurations being combined.

Group-basis combined deployment configurations may be determined based on a maximum of the requirements from deployment configurations being combined. For example, a first deployment configuration may require 100% extension states for three air deflector units and zero extension states for remaining air deflector units. A second deployment configuration may require 100% extension states for two air deflector units and zero extension states for remaining air deflector units. The combined deployment configuration may require a 100% extension state for three air deflector units and zero extension states for remaining air deflector units. Alternatively, a group-basis combined deployment configuration may be determined based on a minimum of the requirements from deployment configurations being combined. Using the first and second deployment configurations from the previous example, a group-basis combined deployment configuration determined from the minimum of the two requirements may require a 100% extension state for two air deflector units and zero extension states for remaining air deflector units.

Figure 12:
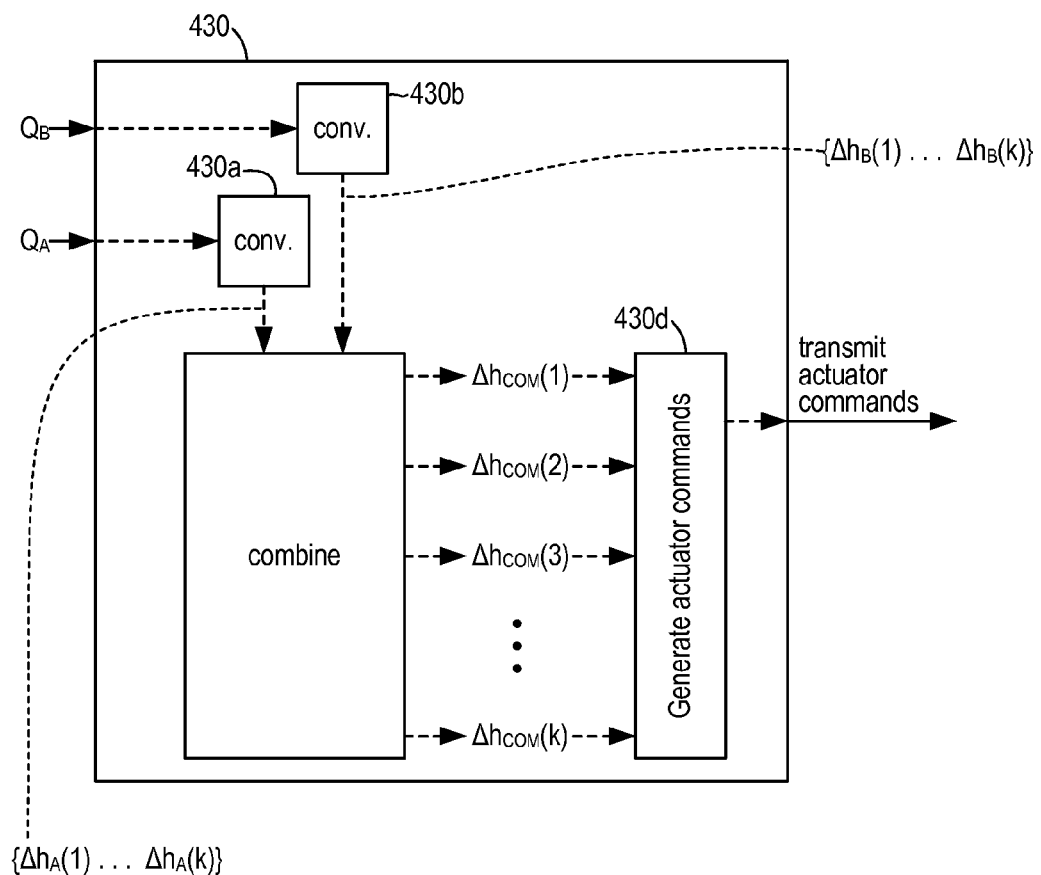
FIG. 12 is a block diagram showing combining operations performed by a controller according to some embodiments.

Operations of step 430 according to some embodiments are illustrated in FIG. 12. A first input to step 430 is a computed data value that has been generated by a first sequence of computational operations based at least in part on received sensor data and that is represented by the variable $Q_A$. In the embodiment of method 400, first input value $Q_A$ is the E43 value. A second input to step 730 is a computed data value that has been generated by a second sequence of computational operations based at least in part on that same received sensor data and that is represented by the variable $Q_B$. In the embodiment of method 400, the second input value $Q_B$ is the E44 value. Because operations such as those shown in FIG. 12 may also be performed in embodiments using input data values computed in manners different than those used to compute the E43 and E44 values, however, the more generic variables $Q_A$ and $Q_B$ are used in FIG. 12.

Controller 63 performs a first set of conversion operations in sub-step 430a to convert the $Q_A$ input value into data representing a first corresponding deployment configuration. The operations of sub-step 430a may be similar to operations described in connection with one sub-steps 107a (FIG. 6A), 107a1 (FIG. 6B), 107a2 (FIG. 6C), or 107a3 (FIG. 6D), or may be another sub-step that generates data representing a deployment configuration. That data may include, e.g., a set of values $\Delta h_A(1)$ through $\Delta h_A(k)$ respectively representing (as percentages of h) extension states required for air deflector units 31(1) through 31(k) in the first corresponding deployment configuration. In subroutine 430b, controller 63 may perform operations to convert the $Q_B$ input value into data representing a second corresponding deployment configuration. The operations of sub-step 430b may also be similar to operations described in connection with one sub-steps 107a, 107a1, 107a2, 107a3, or may be another sub-step that generates data representing a deployment configuration. That data from subroutine 430b may include, e.g., a set of values $\Delta h_B(1)$ through $\Delta h_B(k)$ respectively representing (as percentages of h) extension states for air deflector units 31(1) through 31(k) in the second corresponding deployment configuration.

After obtaining the $\Delta h_A(1)$ through $\Delta h_A(k)$ and $\Delta h_B(1)$ through $\Delta h_B(k)$ values, controller 63 may perform combining operations in sub-step 430c. The operations of sub-step 430c combine requirements of the first deployment configuration represented by values $\Delta h_A(1)$ through $\Delta h_A(k)$ and of the second deployment configuration represented by values $\Delta h_B(1)$ through $\Delta h_B(k)$ and output data representing a combined deployment configuration. The data output from sub-step 430c may be a set of values $\Delta h_{COMB}(1)$ through $\Delta h_{COMB}(k)$ respectively representing (as percentages of h) extension states for air deflector units 31(1) through 31(k) in the combined deployment configuration. The operations of sub-step 430c may determine the combined deployment configuration using one of the individual-basis or group-basis methods described above (e.g., based on maximums, based on minimums, based on averaging, based on summing) or in another manner. In sub-step 430d, controller 63 may generate actuator command signals for one or more air deflector units 31 to implement the combined deployment configuration. The operations of sub-step 430d may be similar to those of sub-step 107b (FIGS. 6A through 6D). In some embodiments, step 430 may include may include a retraction rate limit subroutine or other type of deployment limitation subroutine. At the conclusion of step 430, controller 63 may transmit the actuator command signals to implement the combined deployment configuration.

Given a particular wind turbine, location, and control objective, values for threshold scalars and other parameters of method 400 can be determined using computer simulations and/or testing of an actual wind turbine in a manner similar to that discussed above for other methods. If control subroutines 406 and 428 are included, parameters may be tuned using conventional techniques used for tuning the appropriate type of control subroutine in other types process control applications.

In some embodiments, values for scalars $\mu 4(1)$ through $\mu 4(j)$ may be chosen such that the portion of method 400 that includes steps 402 through 406 is only operative to affect deployment configuration under a first set of conditions. Outside of that first set of conditions, for example, the value for E43 may be too low to correspond to a deployment configuration in which any deflector elements are extended. That first set of conditions may, e.g., correspond to the knee of the power curve for a wind turbine. Similarly, the range of $\beta 4_F$ values operative to enable the switch in step 422 and/or threshold scalar 426 may be chosen so that the portion of method 400 that includes steps 425 through 428 is only operative to affect deployment configuration under a second set of conditions. Outside of that second set of conditions, for example, the value for E44 may be too low to correspond to a deployment configuration in which any deflector elements are extended. That second set of conditions may, e.g., correspond to region III of the power curve for a wind turbine. In some such embodiments, there may be little or no overlap between the first set of conditions and the second set of conditions.

In addition to reducing blade loads caused by wind gusts, methods according to some embodiments utilize air deflector systems to control other potentially damaging conditions. One example of such a condition is tower deflection. As wind speeds increase, tower 9 may deflect and wind turbine 10 may move in a fore-aft direction in a plane generally perpendicular to tower 9. If these tower deflections are excessive, damage may occur. In some embodiments, a controller performs a collective method in which air deflector units on each of blades 20, 23, 26 are collectively controlled to dampen tower deflection.

Figure 13:
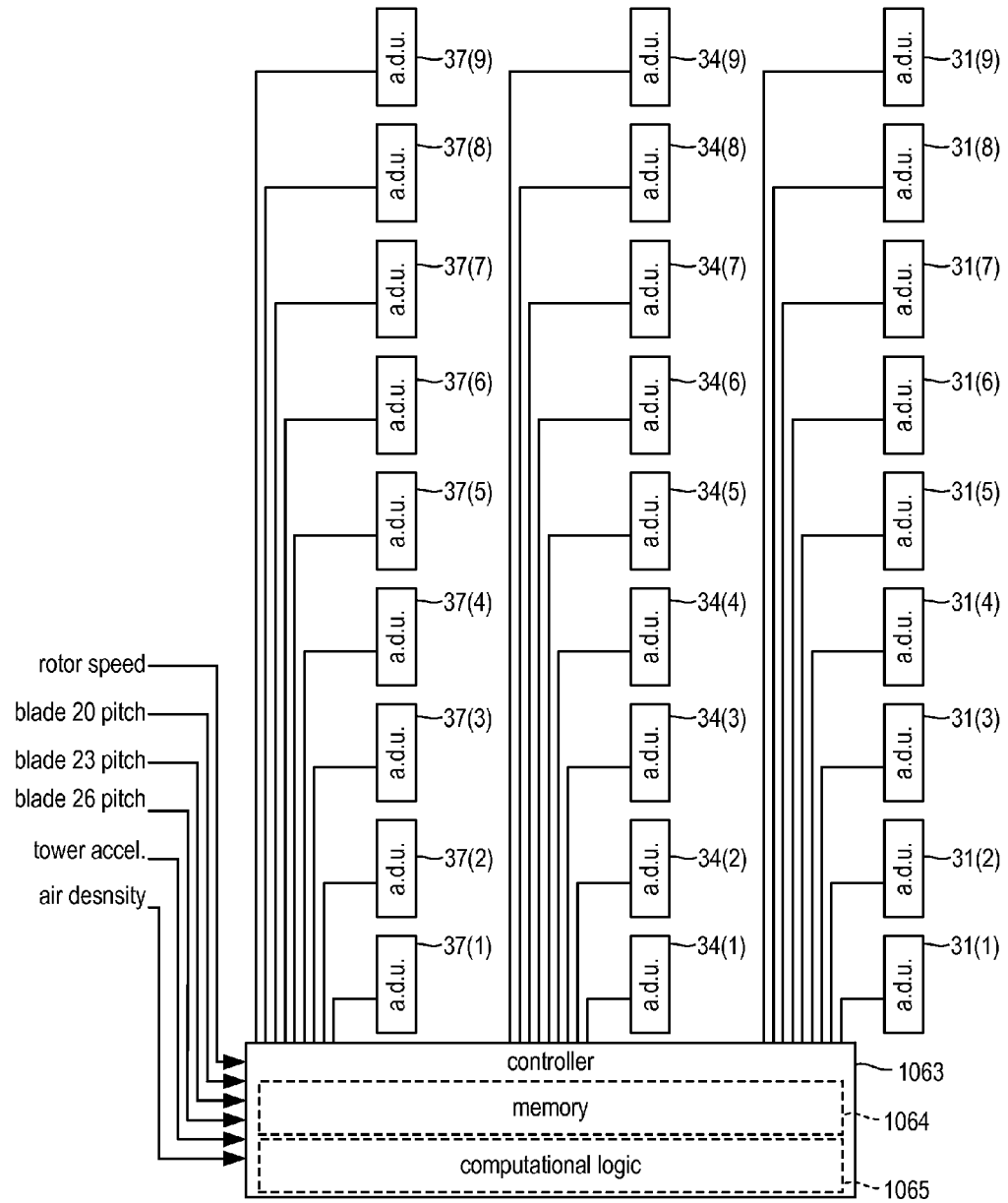
FIG. 13 is a block diagram of a control system, according to some embodiments, configured to collectively control wind turbine blades.

FIG. 13 is a block diagram showing a controller 1063 that may perform such a collective method according to some embodiments. Controller 1063 includes non-transitory memory 1064 (similar to memory 64 of controller 63) to store instructions and/or other data. Controller 1063 also includes computational logic circuits 1065 (similar to computational logic circuits 65 of controller 63) to perform computations and other operations of collective control methods described below. As with controller 63 of FIG. 4 and controllers performing per-blade control algorithms for blades 23 and 26, controller 1063 may be implemented using any of various hardware architectures (e.g., general purpose computer, ASICs, FPGAs, etc.). In some embodiments, a single hardware device serves as controller 63, as controller 1063, and as controllers for per-blade control methods performed for blades 23 and 26. In some such embodiments, each per-blade control method and each collective control method may be performed independently in one of multiple program threads executed in parallel.

Controller 1063 is in communication with air deflector units 31 of blade 20, air deflector units 34 of blade 23 and air deflector units 37 of blade 26 over separate signal paths. Although represented in FIG. 13 as single lines, each of the signal paths between controller 1063 and an air deflector unit may include multiple wires and/or wireless channels.

Controller 1063 may receive data values indicating deflection of tower 9. This data may comprise data that represents the acceleration of wind turbine 10 in the fore-aft directions. This acceleration data may be received from accelerometers located in nacelle 12 and/or on tower 9. Although not shown in FIG. 13, controller 1063 may also receive data from sensors 30 on blade 20, sensors 33 of blade 23 and sensors 34 of blade 26. In addition, controller 1063 may receive data that includes a value for a rotational speed of rotor 11, values for blade pitch of blades 20, 23, and 26, and a value for an air density.

Figure 14:
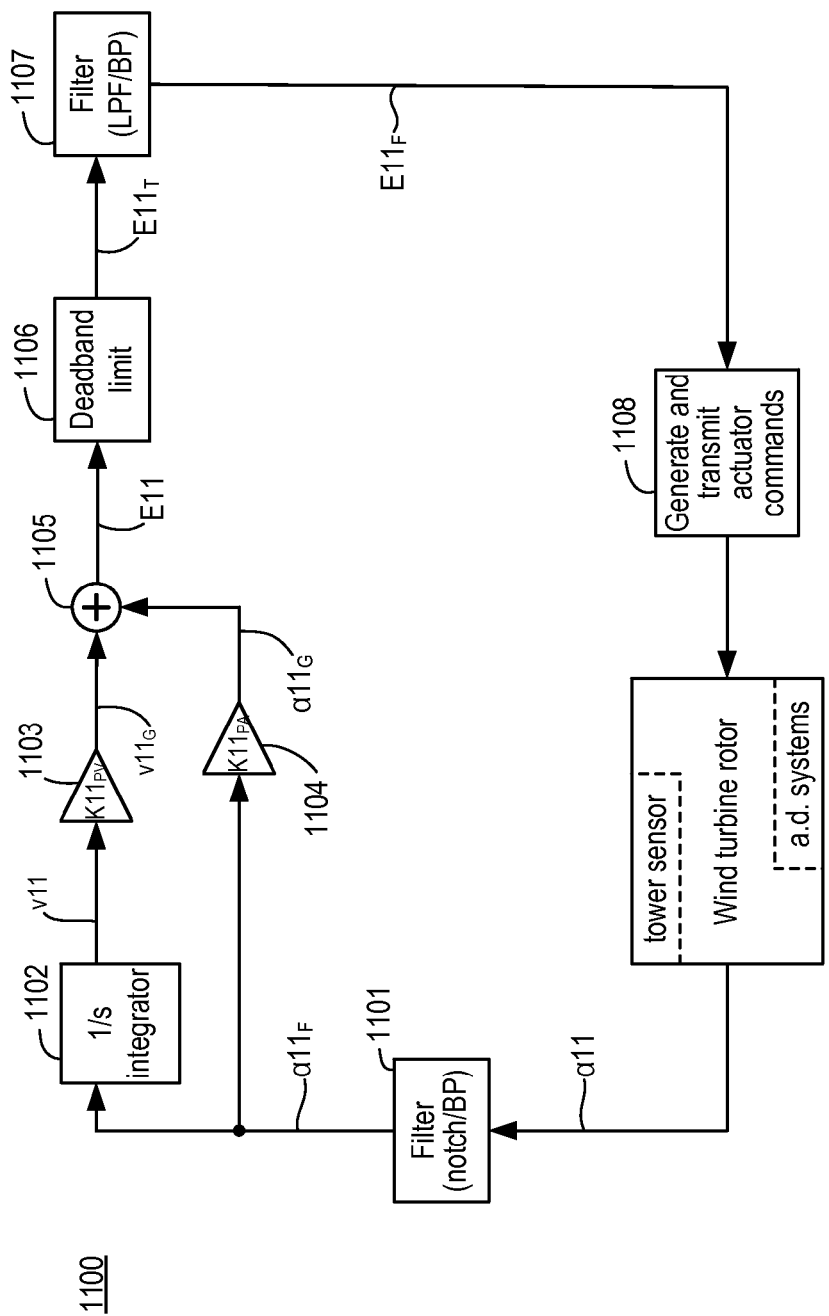
FIG. 14 is a block diagram showing a collective control method performed by a controller in some embodiments.

FIG. 14 is a block diagram of a collective method 1100 that may be performed by controller 1063 to dampen tower deflection. Method 1100 is also a feedback loop. At the start of a current cycle n for method 1100, controller 1063 receives current acceleration data indicative of the current acceleration of turbine 10 in the fore or aft direction. That current acceleration was measured while the air deflector systems of the three blades each has a current deployment configuration. Using the current acceleration data, the controller determines an updated collective deployment configuration. As used herein, a "collective deployment configuration" represents deployment configurations of groups of air deflector units on all blades. In some embodiments, a collective deployment configuration in method 1100 is a collective deployment configuration in which the deployment configurations for air deflector systems on the blades are all the same. At the conclusion of the current cycle n, controller 1063 may then generate and transmit command signals to one or more air deflector units on each blade to implement the updated collective deployment configuration. The next cycle n+1 then begins as the controller receives acceleration data indicative of acceleration after the updated collective deployment configuration has been implemented.

As seen in FIG. 14, a cycle of method 1100 begins with receipt of acceleration data (represented as variable $\alpha11$). In some embodiments, the $\alpha11$ value may be derived from one or more accelerometers located in nacelle 12 and/or on tower 9. In other embodiments, the $\alpha11$ value may be an estimate of acceleration derived from data from sensors 30, 33, and 36 on blade 20, 23, and 26, respectively. The $\alpha11$ value may be passed through a notch or band pass filter in step 1101 to reduce noise, and to focus operation of method 1100 on a particular frequency range (if a band pass filter is used) or remove a particular frequency (if a notch filter is used). In some embodiments, step 1101 may be omitted.

The filtered acceleration value output from step 1101, represented as variable $\alpha11_F$, is time-integrated in step 1102. A proportional velocity gain $K11_{PV}$ is applied to the integrated output of step 1102 (represented as variable v11) in step 1103, resulting in a gain-adjusted value represented as variable $v11_G$. The $\alpha11_F$ value is also adjusted by a proportional acceleration gain $K11_{PA}$ to obtain a gain-adjusted value (represented as variable $\alpha11_G$) in step 1104. The $v11_G$ and $\alpha11_G$ values are summed in step 1105 to obtain an error value (represented as variable E11). In a dead band limit step 1106, controller 1063 may determine if the E11 value is large enough to warrant action. The output of step 1106, represented as variable $E11_T$, may be set to zero if the E11 value is not sufficiently large and otherwise set to the E11 value. The $E11_T$ value may be filtered in step 1107 (e.g., using a band pass or low pass filter). The output of step 1107 (represented as variable $E11_F$) is then the input to step 1108.

In step 1108, controller 1063 may generate and transmit commands to one or more air deflector units on each blade to implement a collective deployment configuration that corresponds to the value input to step 1108. In some embodiments of method 1100, air deflector units on each blade may be affected in the same way. At the conclusion of a method 1100 cycle, the result may be an updated collective deployment configuration in which an updated blade 20 deployment configuration, an updated blade 23 deployment configuration, and an updated blade 26 deployment configuration are the same. In at least some such embodiments, the operations of step 1108 may be similar to those of step 107, but with actuator command signals also generated for blades 23 and 26.

Given a particular wind turbine, location, and defined limits for tower motion, parameters of method 1100 can be determined using computer simulations and/or testing of an actual wind turbine in a manner similar to that discussed above in connection with per-blade control methods, but with focus on tower motion instead of (or in addition to) blade load.

In some embodiments, a collective control method such as method 1100 or another collective control method may be combined with multiple instances of a per-blade control method such as any of methods 100, 200, 300, 400, 1500, or 1600. In some such embodiments, the per-blade method data values from which actuator commands are generated and the collective method data values from which actuator commands are generated may be input into a collective/per-blade actuation command generating and transmitting step. That collective/per-blade actuation command generating and transmitting step may then determine a collective combined deployment configuration based on requirements of per-blade deployment configurations specified by the per-blade methods and requirements of a collective deployment configuration specified by the collective method. The collective combined deployment configuration may require that air deflector units of each blade be actuated in non-identical ways.

Figure 15:
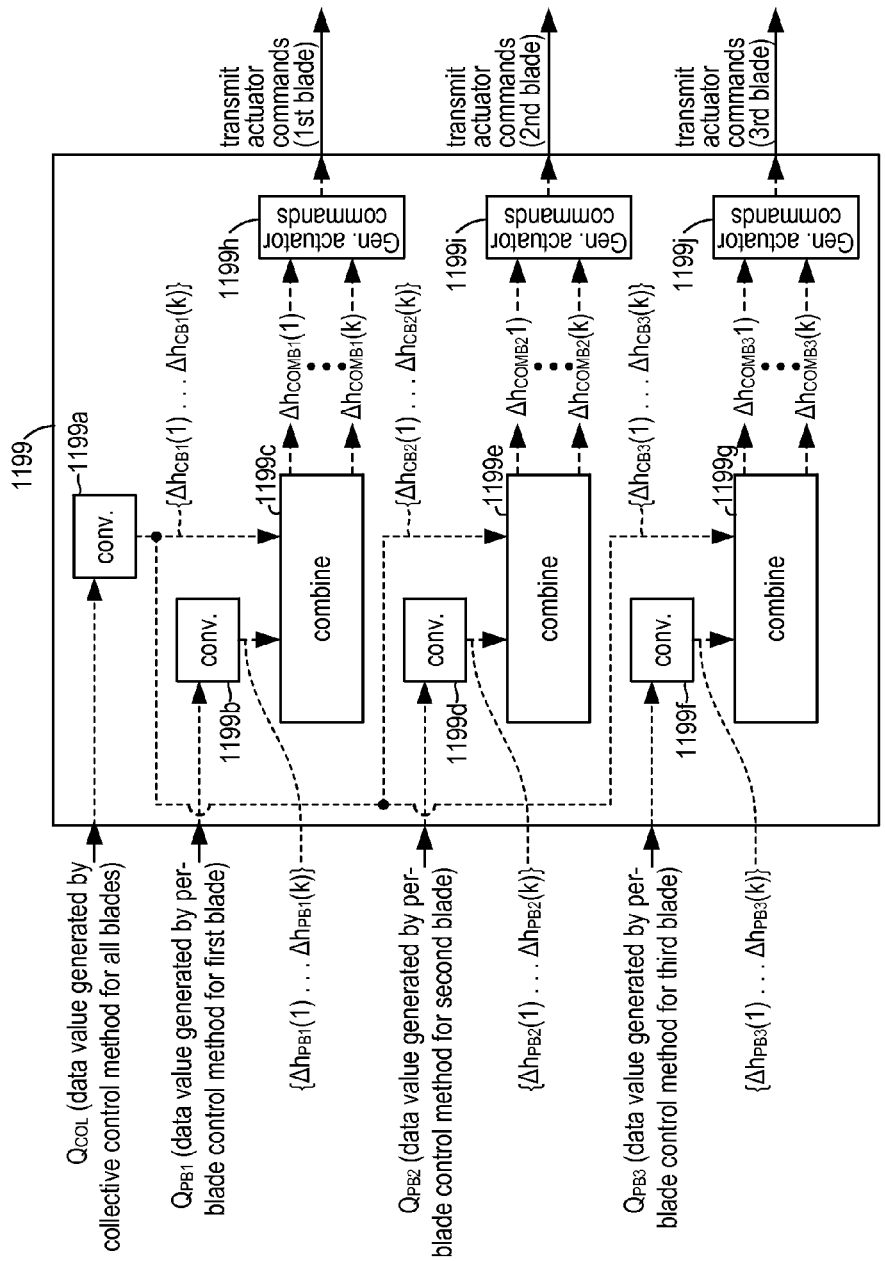
FIG. 15 is a block diagram showing combining operations performed by a controller according to some embodiments.

FIG. 15 illustrates operation of a collective/per-blade actuation command generating and transmitting step 1199 according to some embodiments. Step 1199 may be executed by a single controller. That controller may be one of the controllers executing one of the per-blade methods, the controller executing the collective method, or a separate controller.

The operations of step 1199 are similar to those described in connection with step 430 in FIG. 12, except that a collective combined deployment configuration affecting all blades is determined. A first input to step 1199 is a computed data value from a collective blade control method represented by the variable $Q_{COL}$. The $Q_{COL}$ value is calculated by a collective control method and corresponds to one of a set of collective deployment configurations that the controller is configured to implement, as part of that collective control method, if deployment configurations from per-blade control methods are ignored. Examples of a $QB_{COL}$ value include an $E11_F$ value in method 1100, a similar value from another method that addresses tower movement (e.g., embodiments of method 1100 in which one or more of steps 1101, 1106 and 1107 are omitted), or a value from some other collective control method. The other inputs to step 1199 are computed data values represented by the variables $Q_{PB1}$, $Q_{PB2}$, and $Q_{PB3}$. Each of the $Q_{PB1}$, $Q_{PB2}$, and $Q_{PB3}$ values is computed by a per-blade control method for one of three blades, with each of those per-blade methods executing in parallel with like per-blade methods for the other two blades. Each of the $Q_{PB1}$, $Q_{PB2}$, and $Q_{PB3}$ values corresponds to one of a set of deployment configurations that the respective per-blade controller is configured to implement, as part of that per-blade control method, if a collective deployment configuration from a collective control method is ignored. Examples of a $Q_{PB1}$, $Q_{PB2}$, or $Q_{PB3}$ value include an E1' value in method 100, an E21 value in method 200, an E31 value in method 300, an $E15_F$ value in method 1500, and an E161 value in method 1600.

In sub-step 1199a, the controller performs a set of operations to convert the $Q_{COL}$ value to data representing a collective deployment configuration. That data may include values $\Delta h_{CB1}(1)$ through $\Delta h_{CB1}(k)$ respectively representing extension state percentages for air deflector units (1) through (k) on a first blade, values $\Delta h_{CB2}(1)$ through $\Delta h_{CB2}(k)$ respectively representing extension state percentages for air deflector units (1) through (k) on a second blade, and values $\Delta h_{CB3}(1)$ through $\Delta h_{CB1}(k)$ respectively representing extension state percentages for air deflector units (1) through (k) on a third blade. The subscripts "CB1," "CB2," and "CB3" respectively indicate the portions of the Collective deployment configuration applicable to Blades 1, 2, and 3. The operations of sub-step 1199a may be similar to operations described in connection with one sub-steps 107a, 107a1, 107a2, 107a3, or may be another sub-step that generates data representing a deployment configuration, but performed for all blades.

For each of the $Q_{PB1}$, $Q_{PB2}$ and $Q_{PB3}$ values, the controller performs operations similar to those described in connection with sub-steps 430a and 430b in step 430 (FIG. 12). In step 1199b, the controller converts the $Q_{PB1}$ value into data representing a deployment configuration for blade 1. That data may include values $\Delta h_{PB1}(1)$ through $\Delta h_{PB1}(k)$ respectively representing extension state percentages for air deflector units (1) through (k) on the first blade. In step 1199d, the controller converts the $Q_{PB2}$ value into data representing a deployment configuration for blade 2, which data may include values $\Delta h_{PB2}(1)$ through $\Delta h_{PB2}(k)$ respectively representing extension state percentages for air deflector units (1) through (k) on the second blade. In step 1199f, the controller converts the $Q_{PB3}$ value into data representing a deployment configuration for blade 3, which data may include values $\Delta h_{PB3}(1)$ through $\Delta h_{PB3}(k)$ respectively representing extension state percentages for air deflector units (1) through (k) on the third blade.

In sub-step 1199c, the controller receives the data output from sub-step 1199b (e.g., values $\Delta h_{PB1}(1)$ through $\Delta h_{PB1}(k)$) and the portion of the data output from sub-step 1199a applicable to the first blade (e.g., values $\Delta h_{CB1}(1)$ through $\Delta h_{CB1}(k)$) and performs combining operations similar to those described in connection with FIG. 12. In particular, the controller determines a combined deployment based on the requirements of the deployment configurations represented by the received values and outputs data representing that combined deployment configuration for the first blade. The output data may include, e.g., a set of values $\Delta h_{COMB1}(1)$ through $\Delta h_{COMB1}(k)$ respectively representing extension state percentages for air deflector units (1) through (k) in the combined deployment configuration for the first blade.

The controller may perform similar operations in sub-steps 1199e and 1199g. In sub-step 1199e, the controller receives the data output from sub-step 1199d (e.g., values $\Delta h_{PB2}(1)$ through $\Delta h_{PB2}(k)$) and the portion of the data output from sub-step 1199a applicable to the second blade (e.g., values $\Delta h_{CB2}(1)$ through $\Delta h_{CB2}(k)$), performs combining operations similar to those described in connection with FIG. 12, and outputs data representing a combined deployment configuration for the second blade. The output data may include, e.g., a set of values $\Delta h_{COMB2}(1)$ through $\Delta h_{COMB2}(k)$ respectively representing extension state percentages for air deflector units (1) through (k) in the combined deployment configuration for the second blade. In sub-step 1199g, the controller receives the data output from sub-step 1199f (e.g., values $\Delta h_{PB3}(1)$ through $\Delta h_{PB3}(k)$) and the portion of the data output from sub-step 1199a applicable to the third blade (e.g., values $\Delta h_{CB3}(1)$ through $\Delta h_{CB3}(k)$), performs combining operations similar to those described in connection with FIG. 12, and outputs data representing a combined deployment configuration for the third blade. The output data may include, e.g., a set of values $\Delta h_{COMB3}(1)$ through $\Delta h_{COMB3}(k)$ respectively representing extension state percentages for air deflector units (1) through (k) in the combined deployment configuration for the third blade.

The data output from sub-steps 1199c, 1199e, and 1199g represents the collective combined deployment configuration. In sub-steps 1199h, 1199i and 1199j, the controller may generate actuation command signals for one or more of the air deflector units on each blade to implement the collective combined deployment configuration. The operations of sub-steps 1199h, 1199i and 1199j may be similar to those of sub-steps 107b (FIGS. 6A through 6D) and 430d (FIG. 12). In some embodiments, step 1199 may include a retraction rate limit subroutine or other deployment limitation subroutine. At the conclusion of step 1199, the controller may transmit the actuator command signals to the blades.

In other embodiments, operations of step 1199 may be modified to accept data from a per-blade method such as method 400. For example, input $Q_{PB1}$ could be replaced by inputs $Q_{PB1A}$ and $Q_{PB1B}$. The $Q_{PB1A}$ value could be a value similar to the $Q_A$ value in FIG. 12 and the $Q_{PB1B}$ value could be a value similar to the $Q_B$ value in FIG. 12. Operations of sub-step 1199b could include operations similar to operation of sub-steps 430a, 430b, and 430c of FIG. 12. Similar modifications could be made with regard to the $Q_{PB2}$ input, sub-step 1199d, the $Q_{PB3}$ input, and sub-step 1199f.

Rotor speed is another condition that may be controlled utilizing air deflector units. In some embodiments, a controller performs a method in which air deflector units on each of blades 20, 23, 26 are collectively controlled to help reduce speed at which rotor 11 rotates. The controller performing such a method may be controller 1063 (FIG. 13) or may be a separate controller similar to controller 1063. In some embodiments a collective method to control air deflector units in response to rotor speed may execute in parallel with a collective method to control air deflector units in response to tower movement and/or with one or more other collective control methods. Such parallel methods could take the form of separate and independent programming threads executing in a single hardware device or may be executed by multiple hardware devices.

Figure 16:
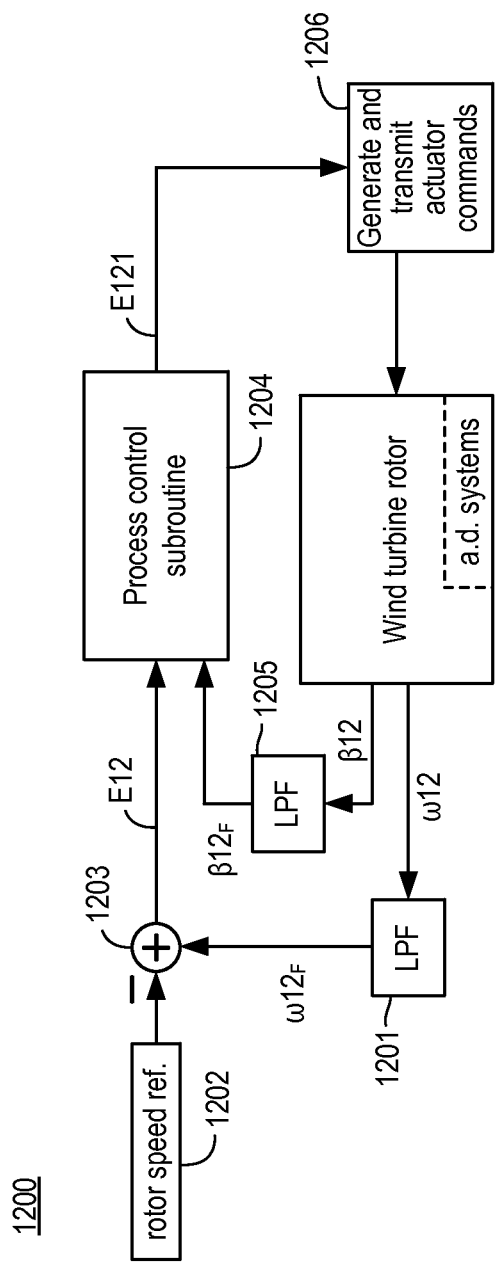
FIG. 16 is a block diagram showing a collective control method performed by a controller in some embodiments.

FIG. 16 is a block diagram of a collective method 1200 that may be performed by a controller to control rotor speed. Method 1200 is also a feedback control loop. At the start of a current cycle n for method 1200, the controller receives current rotor speed data indicative of the current rotational speed of rotor 11. That current rotor speed is measured while each of the air deflector systems of the three blades has a current deployment configuration. Using the current rotor speed data, the controller determines an updated collective deployment configuration for the rotor blades. At the conclusion of the current cycle n, the controller may then generate and transmit command signals to one or more of air deflector units on each blade to implement the updated collective deployment configuration. The next cycle n+1 then begins as the controller receives rotor speed data indicative of rotor speed after the updated collective deployment configuration has been implemented.

As seen in FIG. 16, a cycle of method 1200 begins with receipt of rotor speed data (represented as variable $\omega 12$). In some embodiments, the $\omega 12$ value may be received from a tachometer coupled to the rotor shaft. Rotor speed may also or alternatively be estimated from sensor data such as data from sensors 30. The $\omega 12$ value may be passed through a low pass filter in step 1201 to reduce sensor noise and to prevent or limit response to high-frequency variations in rotor speed. In some embodiments, step 1201 may be omitted.

The filtered rotor speed value output from step 1201 is represented as variable $\omega 12_F$. In step 1203, a threshold scalar 1202 is applied to the $\omega 12_F$ value. In particular, threshold scalar 1202 is subtracted from the $\omega 12_F$ value to obtain an error value (represented as variable E12). Threshold scalar 1202 may be the rated speed for turbine 10.

In block 1204, additional operations may be performed on the error signal from step 1203 to obtain a further revised output signal value (represented as variable E121). Those additional steps may include a proportional (P) control subroutine, proportional-derivative (PD) control subroutine, a proportional-integral (PI) control subroutine, a proportional-integral-derivative (PID) control subroutine, a linear-quadratic regulator (LQR) control subroutine, a linear-quadratic-Gaussian (LQG) control subroutine, an H-infinity control subroutine, or other type of control subroutine. In some embodiments the additional steps of block 1204 may be omitted.

In some embodiments of method 1200, a value for average blade pitch (represented as variable $\beta 12$) is also received by the controller in a method 1200 cycle. In embodiments where blades of rotor 11 are collectively pitched, the $\beta 12$ value may be the collective pitch. The $\beta 12$ value may optionally be low pass filtered in step 1205 to reduce noise and to prevent or limit response to high-frequency variations in blade pitch. The filtered output (represented as variable $\beta 12_F$), or the $\beta 12$ value if step 1205 is omitted, may also be received as an input to block 1204. The $\beta 12_F$ may be used, e.g., as an index to select one or more gain values from one or more gain schedules. That gain schedule may comprise a look-up table, calculations, or a combination of a look-up table and calculations. In some embodiments, the input to that gain schedule may be a different input that is representative of turbine operating condition. As indicated previously, examples of such inputs include, without limitation, values based at least in part on rotor speed and values based at least in part on wind speed.

The E121 value is input to step 1206. In step 1206, the controller may generate and transmit commands to one or more air deflector units on each blade to implement deployment configurations that correspond to values input to step 1206. Because method 1200 is a collective control method, in at least some embodiments the air deflector units on each blade may be affected in the same way. The operations of step 1206 may be similar to those of step 107 described in connection with FIGS. 6A through 6D, but performed for all blades instead of for a single blade. At the conclusion of a method 1200 cycle, the result is a collective updated deployment configuration in which an updated blade 20 deployment configuration, an updated blade 23 deployment configuration, and an updated blade 26 deployment configuration are the same.

Given a particular wind turbine, location, and rated rotor speed, parameters of method 1200 can be determined using computer simulations and/or testing of an actual wind turbine in a manner similar to that discussed in connection with per-blade control methods, but with focus on rotor speed instead of, or in addition to, blade load. If control subroutine 1204 is included, parameters may be tuned using conventional techniques for tuning the appropriate type of control subroutine in other types process control applications.

In some embodiments, a method such as method 1200 may be performed in conjunction with a conventional rotor speed control method that operates by adjusting blade pitches. Air deflector units can be actuated more rapidly than a blade pitch actuator. Accordingly, use of method 1200 in conjunction with a conventional rotor speed control method allows more speed regulation and reduces wear on pitch actuators.

Figure 17:
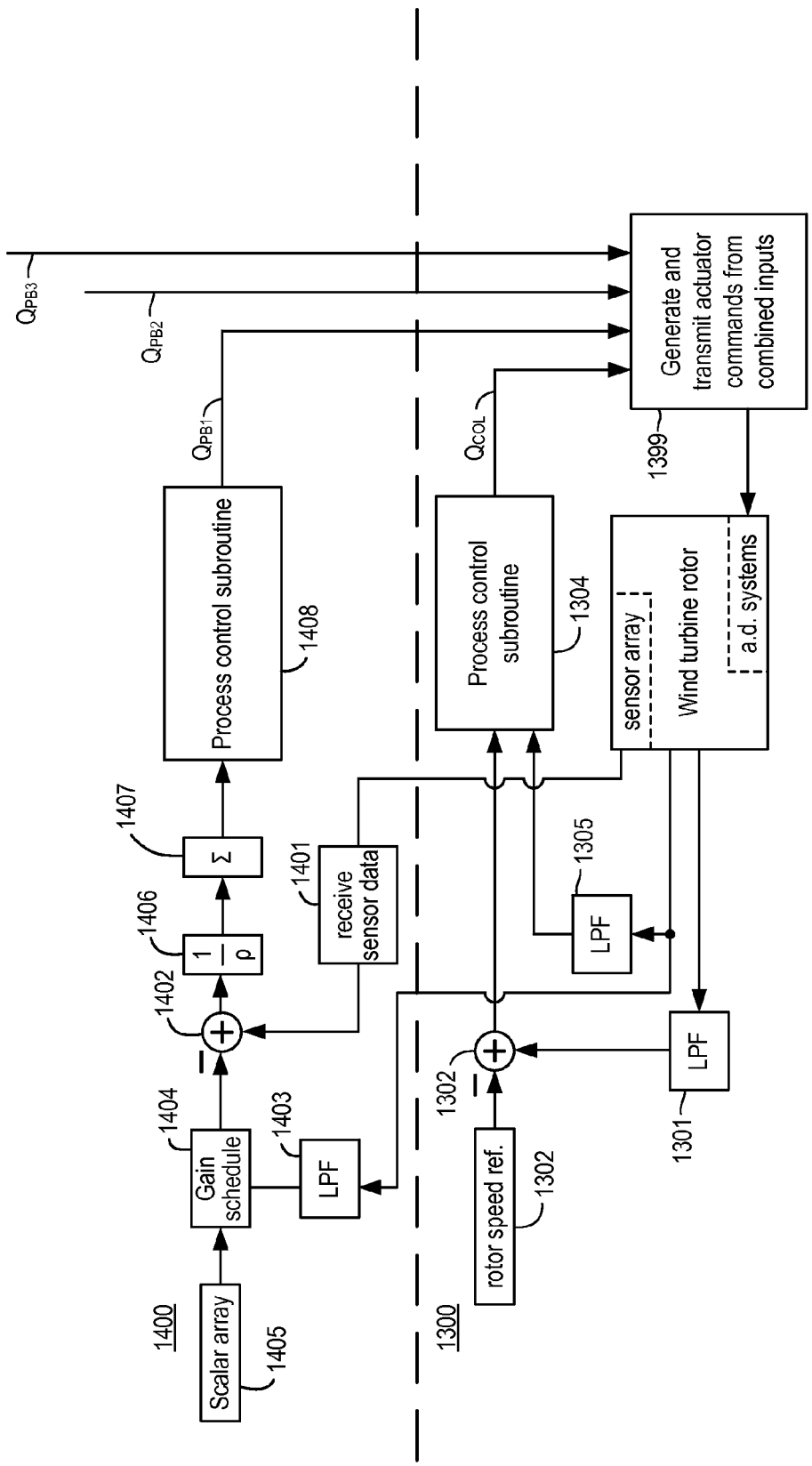
FIG. 17 is a block diagram showing a collective control method performed in conjunction with per-blade control methods according to some embodiments.

As with tower motion control methods such as method 1100, a collective rotor speed regulation method such as method 1200 may be used in parallel with per-blade control methods. FIG. 17 is a block diagram showing an example of such a combination. The portion of FIG. 17 below the broken line is a block diagram for a rotor speed regulation method 1300. Steps 1301 through 1305 are similar to steps 1201 through 1205 of method 1200. The output from block 1304, represented by variable $Q_{COL}$, is input to a step 1399. Step 1399 may be similar to step 1199 described in connection with FIG. 15. The portion of FIG. 17 above the broken line is a block diagram of a per-blade control method 1400 that is performed by a controller for a first blade. Steps 1401 through 1408 of method 1400 may be similar to steps 301 through 308 of method 300 (FIG. 9). The output from block 1408, represented by variable $Q_{PB1}$, is input to step 1399. The other inputs to step 1399 are represented by variables $Q_{PB2}$ and $Q_{PB3}$. The $Q_{PB2}$ value is output by a portion of a second per-blade method similar to block 1408 of method 1400. The second per-blade method is similar to method 1400 and is performed in parallel with and independently of method 1400. The $Q_{PB3}$ value is output by a portion of a third per-blade method similar to block 1408 of method 1400. The third per-blade method is also similar to method 1400 and is performed in parallel with, and independently of, method 1400 and the second per-blade method.

Additional embodiments may include numerous features in addition to, or as an alternative to, features of embodiments described thus far. Various steps of methods described above may be rearranged or omitted. Embodiments include additional combinations of methods described above. As but one example, methods similar to method 400 may combine other types of per-blade algorithms (e.g., a method similar to method 100 may be combined with a method similar to method 300). Embodiments also include additional combinations of a collective control method and per-blade control methods. As but one example, a collective method such as method 1100 or method 1200 could be combined with multiple parallel-executing instances of per-blade control method 100, 200, 300, 400, 1500, or 1600.

In some embodiments, sensor data values may not be adjusted based on radial blade locations of each sensor. Instead, a single average loading location may be assumed, e.g., based on an average of area centers of load curves across a blade under various ranges of conditions. Values for method parameters may then be selected based on the assumed average loading location.

In some embodiments, a wind turbine blade may include types of air deflector units instead of, or in addition to, air deflector units such as those described in connection with FIG. 3A. Other types of air deflector units may include trailing edge flaps similar to flaps found on aircraft wings, units configured to release a burst of high pressure air into the air flow over a surface of a blade so as to disrupt that flow, and other types of active aerodynamic load control devices. Control methods such as those described herein may be readily adapted for use in connection with such other types of air deflector units. In embodiments utilizing flaps, actuator commands from a controller may implement deployment by increasing or decreasing flap angle. In some such embodiments, a controller may be configured to implement flap deployment configurations in which each of one or more flaps is either fully deployed (maximum flap angle) or has zero deployment (zero flap angle). In embodiments utilizing high pressure air release, actuator commands from a controller may implement deployment by opening or closing solenoid valves to release or stop the release of air. In some such embodiments, a controller may be configured to implement high pressure air deployment configurations in which each of one or more air release ports is either fully deployed (open) or has zero deployment (closed).

In some embodiments, a wind turbine blade may include types of sensors instead of, or in addition to, differential pressure sensors such as those described in connection with FIG. 3B. For measuring blade load, and as indicated above, such sensors may include, e.g., strain gauges and tip deflection sensors. For measuring tower movement, such sensors may include, e.g., tower and/or nacelle position monitoring sensors. For measuring rotor speed, such sensors may include, e.g., sensors that optically detect blades passing a particular point in the rotor rotation. Control methods such as those described herein may be readily adapted for use in connection with such other types of sensors.

Figure 18:
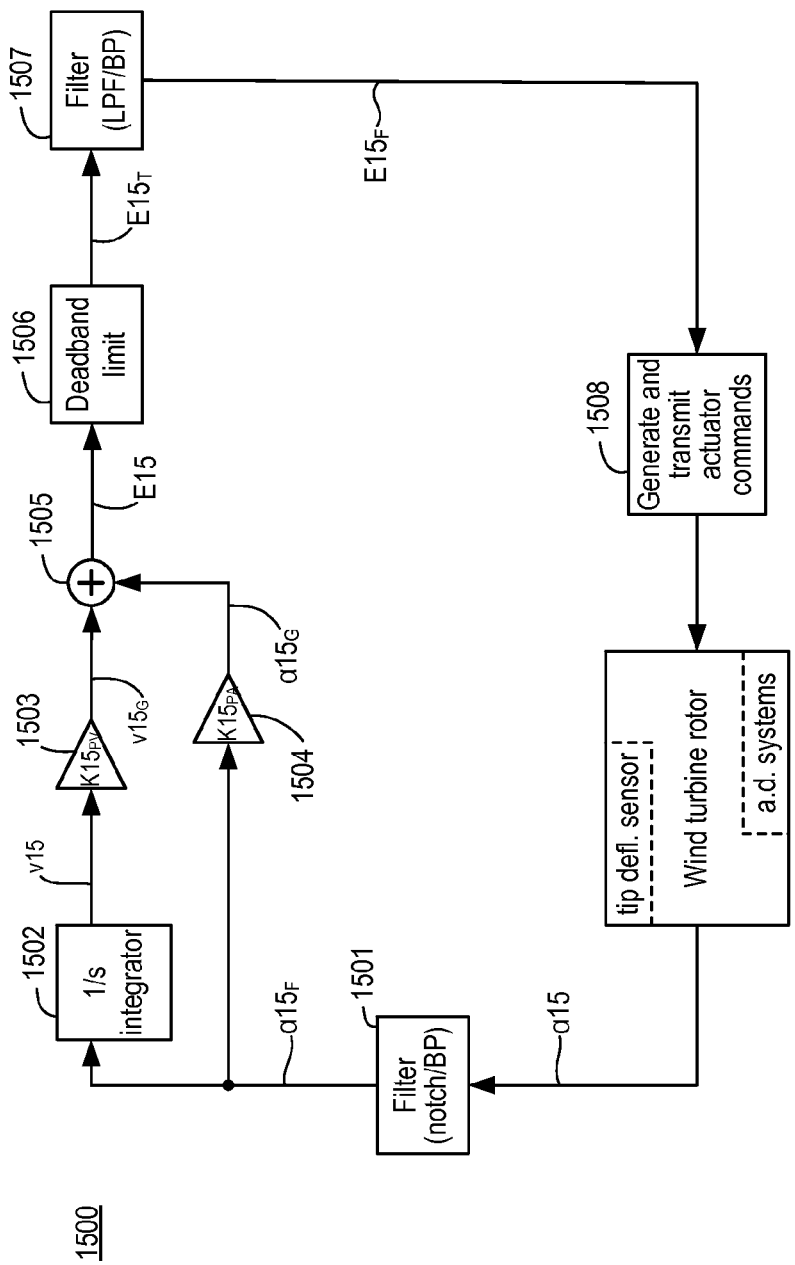
FIG. 18 is a block diagram showing a per-blade control method performed by a controller in some embodiments.

In some embodiments, method 1100 (FIG. 14) may be adapted to operate as a per-blade control method to dampen blade deflection. FIG. 18 is a block diagram of a per-blade method 1500 according to some such embodiments. Steps 1501 through 1507 are similar to steps 1101 through 1107 of method 1100. In method 1500, however, a cycle begins with receipt of acceleration data (represented by variable α15) indicative of the acceleration of a blade tip in a direction out of the plane of rotor rotation. The α15 value may be provided by a tip deflection sensor or by another type of sensor. A filtered signal based on the α15 value, represented in FIG. 18 by the variable $α15_F$, is input to steps 1502 and 1504. Step 1508 is similar to step 1108 of method 1100, except that actuation commands only generated for one or more air deflector units on a single blade in step 1508. Parameters of method 1500 may be determined using computer simulations and/or testing of an actual wind turbine in a manner similar to that discussed above in connection with other per-blade control methods, but with focus on blade deflection instead of (or in addition to) blade load. Methods similar to method 1500 may also be performed in parallel for each of the other blades on a rotor.

Figure 19:
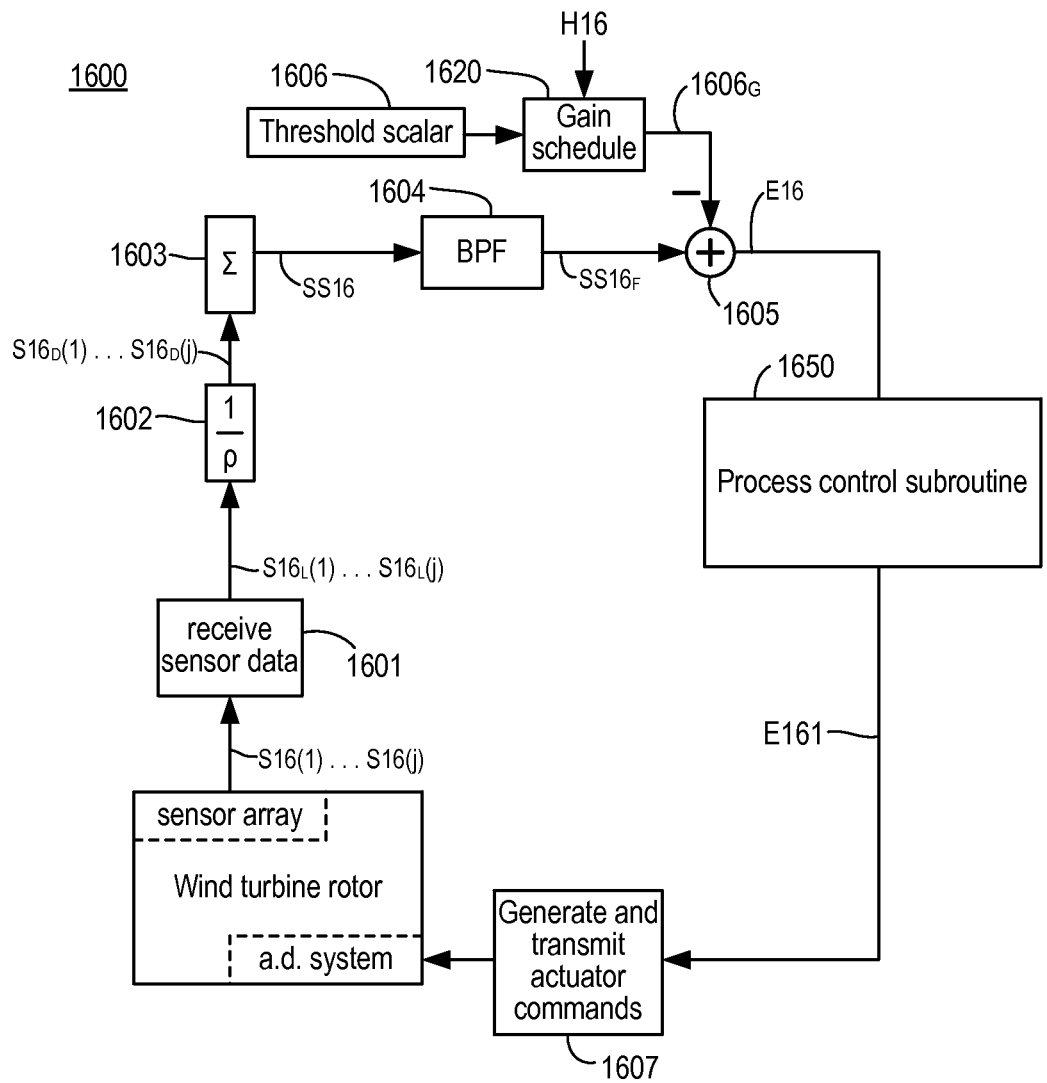
FIG. 19 is a block diagram showing a per-blade control method performed by a controller in some embodiments.

In some embodiments, a gain schedule may be used in conjunction with other parameters. FIG. 19 is a block diagram of a per-blade control method 1600 according to some such embodiments. Steps 1601 through 1606, 1650 and 1607 are respectively similar to steps 101 through 106, 150 and 107 of method 100 (FIG. 5). In method 1600, controller 63 sensor data values (represented as variables S16(1) through S16(j)) from sensor array 61. As part of step 1601, controller 63 may multiply the S16(1) through S16(j) values by the radial length distances respectively associated with sensors 30(1) through 30(j). The output of step 1601 may be a set of location adjusted sensor data values (represented as variables $S1_L(1)$ through $S1_L(j)$). In other embodiments, radial length distances may be applied in other steps. In step 1602, controller 63 divides each of the $S16_L(1)$ through $S16_L(j)$ values by p, the measured air density. In step 1603, controller 63 sums the array of density-adjusted sensor values output from step 1602 (represented as variable $S16_D(1)$ through $S16_D(j)$) and obtains a summed signal value (represented as variable SS16). The SS16 value may be band pass filtered in step 1604 to obtain a filtered summed signal value (represented as variable $SS16_F$).

Similar to method 100, a value is subtracted from the $SS16_F$ value in step 1605. Unlike method 100, however, that value (represented as variable 1606) is a threshold scalar that is first adjusted in a gain schedule step 1620. Step 1620 receives threshold scalar 1606 and an input represented by variable H16. The H16 value may be an input that is representative of the operating condition of turbine 10. Examples of such inputs include, without limitation, values based at least in part on blade pitch, values based at least in part on rotor speed, and values based at least in part on wind speed. Step 1620 may operate in a manner similar to other gain schedule steps described above and may select a gain, based on an H16 value, using a look-up table, a calculation, or a combination thereof.

Given a particular wind turbine, location, and control objective, values for parameters of method 1600 can be determined using computer simulations and/or testing in a manner similar to that described above for other methods. If control subroutine 1650 is included, its parameters may be tuned using conventional techniques used for tuning the appropriate type of control subroutine in other types process control applications.

In addition to methods such as are described above, embodiments include one or more non-transitory machine-readable media storing machine-executable instructions that, when executed, cause one or more controllers to perform one or more operations of one or more methods described herein. Embodiments also include a controller (or multiple controllers) that comprise a non-transitory memory and computational logic circuits, and wherein the non-transitory memory and computational logic circuits are configured to execute instructions stored in the memory and that, when executed, cause the one or more controllers to perform one or more operations of one or more methods described herein.

As used herein, a second data value is based at least in part on a first data value if the first data value contributes to determining the second data value and changing the first data value would change the second data value. In some cases, a second data value based at least in part on a first data value may be the same as the first data value. In other cases, the first and the second data values may be different, e.g., the first data value may be used to calculate a third data value and the third data value is then used to calculate the second data value.

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

The invention claimed is:

1. A method for operating a wind turbine, the method comprising:
   receiving sensor data indicative of a current loading condition of a blade of a rotating rotor of the wind turbine, the blade comprising a plurality of air deflector units having a current deployment configuration, the blade further comprising multiple sensors, the sensor data comprising a separate sensor value corresponding to each of the multiple sensors;
   obtaining a set of error values by subtracting a different one of multiple threshold scalar values from each of multiple different input values, each of the multiple different input values comprising a value based at least in part on a different one of the sensor values;
   summing the error values to obtain a first summed value;
   generating actuator commands for at least one of the air deflector units to implement an updated deployment configuration of the air deflector units, wherein the updated deployment configuration corresponds to a data value based at least in part on the first summed value; and
   transmitting the actuator commands.

2. The method of claim 1, further comprising applying an additional control subroutine to the first summed value to obtain the data value based at least in part on the first summed value.

3. The method of claim 1, further comprising applying a deployment limitation subroutine.

4. The method of claim 3, wherein each of the air deflector units includes a deflector element extendable into and retractable from air flow over a portion of the blade, and wherein applying the deployment limitation subroutine comprises delaying, based on a determination that implementation of the updated deployment configuration requires retraction of a deflector element of at least one of the air deflector units, a pre-determined time interval before transmitting the actuator commands.

5. The method of claim 1, further comprising:
   identifying, based on an input representative of an operating condition of the wind turbine, one of multiple gain schedules; and
   multiplying each of multiple scalar values by a different one of multiple gain values in the identified gain schedule to obtain the multiple threshold scalar values.

6. The method of claim 5, further comprising applying an additional control subroutine to the first summed value to obtain the data value based at least in part on the first summed value.

7. The method of claim 1, further comprising:
   summing a second set of values based at least in part on the sensor values to obtain a second summed value;
   receiving pitch data indicative of a current pitch of the blade;
   determining, utilizing a value based at least in part on the pitch value, to further process the second summed value;
   subtracting a different threshold scalar value from an input to the subtracting, wherein the input to the subtracting is based at least in part on the second summed value; and
   obtaining a second error value,
   wherein generating actuator commands further comprises:
     determining a combined deployment configuration based on requirements of a first deployment configuration corresponding to a value based at least in part on the second error value and a second deployment configuration corresponding to a value based at least in part on the first summed value.

8. The method of claim 7, wherein determining the combined deployment configuration comprises an individual-basis determination based on one of a maximum, a minimum, a sum or an average of the requirements of the first deployment configuration and the requirements of the second deployment configuration.

9. The method of claim 7, wherein determining the combined deployment configuration comprises a group-basis determination based on one of a maximum, a minimum, a sum or an average of the requirements of the first deployment configuration and the requirements of the second deployment configuration.

* * * * *